(12) United States Patent
Zhao et al.

(10) Patent No.: US 11,134,191 B2
(45) Date of Patent: Sep. 28, 2021

(54) IMAGE DISPLAY METHOD AND ELECTRONIC DEVICE

(71) Applicant: Huawei Technologies Co., Ltd., Shenzhen (CN)

(72) Inventors: Wenlong Zhao, Beijing (CN); Guangxue Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 16/490,802

(22) PCT Filed: Apr. 26, 2017

(86) PCT No.: PCT/CN2017/082058
§ 371 (c)(1),
(2) Date: Sep. 3, 2019

(87) PCT Pub. No.: WO2018/157464
PCT Pub. Date: Sep. 7, 2018

(65) Prior Publication Data
US 2020/0029017 A1    Jan. 23, 2020

(30) Foreign Application Priority Data

Mar. 3, 2017 (CN) .......................... 201710125171.0

(51) Int. Cl.
*H04N 5/232* (2006.01)
(52) U.S. Cl.
CPC ... *H04N 5/23238* (2013.01); *H04N 5/232935* (2018.08); *H04N 5/232939* (2018.08); *H04N 5/23216* (2013.01)
(58) Field of Classification Search
CPC .......... H04N 5/23238; H04N 5/23293; H04N 5/23222; H04N 5/2628; H04N 21/816;
(Continued)

(56) References Cited

U.S. PATENT DOCUMENTS 8,831,380 B2 * 9/2014 Ofek ......................... G06T 5/50
382/113
9,824,723 B1 * 11/2017 Bentley .................. G11B 27/34
(Continued)

FOREIGN PATENT DOCUMENTS

CA    2822946 A1    2/2015
CN    1480786 A    3/2004
(Continued)

OTHER PUBLICATIONS

Machine Translation and Abstract of Chinese Publication No. CN103646052, Mar. 19, 2014, 29 pages.
(Continued)

*Primary Examiner* — Nasim N Nirjhar
(74) *Attorney, Agent, or Firm* — Conley Rose, P.C.

(57) ABSTRACT

An image display method includes obtaining, by an electronic device, a first instruction triggered by a user, where the first instruction instructs the electronic device to display a panoramic image. The method further includes obtaining, by the electronic device in response to the first instruction, historical bearing information and real-time bearing information of a camera lens of the electronic device, where the historical bearing information indicates a historical bearing of the camera lens that is measured when the panoramic image is shot, and the real-time bearing information indicates a current target bearing of the camera lens. The method further includes displaying, by the electronic device, a target picture corresponding to the target bearing in the panoramic image when the historical bearing information includes the target bearing.

14 Claims, 29 Drawing Sheets

(58) Field of Classification Search
CPC ............... H04N 7/181; H04N 5/23229; H04N 5/23245; H04N 5/23232; H04N 5/265; H04N 19/436; H04N 5/23258; H04N 1/3876; H04N 5/2252; H04N 5/232; H04N 5/23267

See application file for complete search history.

(56) References Cited

U.S. PATENT DOCUMENTS

| | | | |
|---|---|---|---|
| 9,934,823 B1* | 4/2018 | Bentley | G11B 27/3081 |
| 10,324,293 B2* | 6/2019 | Newman | G02B 27/017 |
| 10,559,090 B2* | 2/2020 | Tang | H04N 13/204 |
| 10,600,150 B2* | 3/2020 | Kim | G06F 3/011 |
| 2003/0231243 A1 | 12/2003 | Shibutani | |
| 2008/0066000 A1* | 3/2008 | Ofek | G06F 16/29 |
| | | | 715/757 |
| 2010/0302347 A1 | 12/2010 | Shikata | |
| 2011/0126119 A1* | 5/2011 | Young | G06F 3/048 |
| | | | 715/744 |
| 2011/0173565 A1* | 7/2011 | Ofek | G09B 29/00 |
| | | | 715/790 |
| 2011/0292076 A1* | 12/2011 | Wither | G06F 16/9537 |
| | | | 345/632 |
| 2012/0033032 A1 | 2/2012 | Kankainen | |
| 2012/0075410 A1 | 3/2012 | Matsumoto et al. | |
| 2013/0002923 A1 | 1/2013 | Kanma et al. | |
| 2013/0141524 A1* | 6/2013 | Karunamuni | H04N 5/23293 |
| | | | 348/38 |
| 2013/0229434 A1* | 9/2013 | Ofek | G06T 5/50 |
| | | | 345/634 |
| 2013/0229484 A1* | 9/2013 | Furumura | H04N 5/232 |
| | | | 348/36 |
| 2013/0322844 A1* | 12/2013 | Suzuki | G06F 3/04815 |
| | | | 386/230 |
| 2014/0072274 A1 | 3/2014 | Nitta et al. | |
| 2014/0118487 A1 | 5/2014 | Shikata | |
| 2014/0270692 A1* | 9/2014 | Suzuki | G06F 3/04815 |
| | | | 386/230 |
| 2015/0062179 A1 | 3/2015 | Matas et al. | |
| 2015/0082187 A1 | 3/2015 | Wallters et al. | |
| 2016/0028950 A1* | 1/2016 | Perazzi | G06T 3/4038 |
| | | | 348/38 |
| 2016/0180845 A1* | 6/2016 | Kim | H04M 1/72555 |
| | | | 348/211.2 |
| 2017/0019504 A1* | 1/2017 | Ota | H04N 21/2187 |
| 2017/0307889 A1* | 10/2017 | Newman | G06F 3/03547 |
| 2018/0122042 A1* | 5/2018 | Kim | G06F 3/0346 |
| 2018/0150973 A1* | 5/2018 | Tang | G06T 7/85 |

FOREIGN PATENT DOCUMENTS

| | | |
|---|---|---|
| CN | 101902571 A | 12/2010 |
| CN | 102754423 A | 10/2012 |
| CN | 103646052 A | 3/2014 |
| CN | 105827978 A | 8/2016 |
| CN | 106101552 A | 11/2016 |
| CN | 106445129 A | 2/2017 |
| JP | H11155124 A | 6/1999 |
| JP | 2001154647 A | 6/2001 |
| JP | 2005026859 A | 1/2005 |
| JP | 2009239621 A | 10/2009 |
| JP | 2009268037 A | 11/2009 |
| JP | 2010278587 A | 12/2010 |
| JP | 2011193169 A | 9/2011 |
| JP | 2012075018 A | 4/2012 |
| JP | 2014053794 A | 3/2014 |
| JP | 2015032861 A | 2/2015 |
| JP | 2016533593 A | 10/2016 |

OTHER PUBLICATIONS

Machine Translation and Abstract of Chinese Publication No. CN105827978, Aug. 3, 2016, 24 pages.

Machine Translation and Abstract of Chinese Publication No. CN106101552, Nov. 9, 2016, 26 pages.

Foreign Communication From a Counterpart Application, Chinese Application No. 201780008045.5, Chinese Office Action dated Dec. 3, 2019, 8 pages.

Foreign Communication From a Counterpart Application, PCT Application No. PCT/CN2017/082058, English Translation of International Search Report dated Sep. 28, 2017, 2 pages.

Foreign Communication From a Counterpart Application, PCT Application No. PCT/CN2017/082058, English Translation of Written Opinion dated Sep. 28, 2017, 5 pages.

Foreign Communication From a Counterpart Application, European Application No. 17899039.6, Extended European Search Report dated Nov. 15, 2019, 8 pages.

* cited by examiner (a)

(b)

(a)

(b)

(c)

IMAGE DISPLAY METHOD AND ELECTRONIC DEVICE

CROSS-REFERENCE TO RELATED APPLICATIONS

This application is a U.S. National Stage of International Patent Application No. PCT/CN2017/082058 filed on Apr. 26, 2017, which claims priority to Chinese Patent Application No. 201710125171.0 filed on Mar. 3, 2017. Both of the aforementioned applications are hereby incorporated by reference in their entireties.

TECHNICAL FIELD

This application relates to the image processing field, and in particular, to an image display method and an electronic device.

BACKGROUND

A user may use a photo or video shooting function of a mobile phone to record some image information, for example, to shoot a panoramic photo and the like of a building or a place. In this way, when viewing the image information later, the user may extract required information from the image information.

Currently, in addition to a function of storing image information captured by a camera lens when the user is shooting an image, the mobile phone may further have a function of recording, in the image information, attribute information of the image that is collected when the image is shot and processed, for example, a shooting date, camera lens parameters (such as a value of a shutter speed and a value of a focal length), image processing parameters (such as contrast, white balance, and saturation), and Global Positioning System (global positioning system, GPS) positioning data. In this way, when viewing the image information later, the user may further view the attribute information.

However, content of the foregoing attribute information is not comprehensive enough, and by viewing the attribute information, the user may be still unable to accurately learn of specific details of image shooting.

SUMMARY

This application provides an image display method and an electronic device, to help a user accurately learn of specific details of image shooting.

To achieve the foregoing objective, this application uses the following technical solutions:

According to a first aspect, this application provides an image display method, including: obtaining, by an electronic device, a first instruction triggered by a user, where the first instruction is used to instruct the electronic device to display a panoramic image; and in response to the first instruction, obtaining, by the electronic device, historical bearing information and real-time bearing information of a camera lens of the electronic device, where the historical bearing information is used to indicate a historical bearing of the camera lens that is measured when the panoramic image is shot, and the real-time bearing information is used to indicate a current target bearing of the camera lens. When the historical bearing information includes the target bearing, it indicates that a target orientation to which the camera lens of the electronic device points currently is the same as a historical bearing of the camera lens that is recorded in the foregoing panoramic image. In this case, the electronic device may display a target picture corresponding to the target bearing in the panoramic image, so that a specific picture that is shot in the same orientation as the current target orientation is more truly reproduced in a process of displaying the panoramic image, and the user has same experience of viewing a shot image as that of shooting the image.

In a possible design method, after the obtaining, by the electronic device, historical bearing information and real-time bearing information of a camera lens of the electronic device, the method further includes: when the historical bearing information does not include the target bearing indicated by the real-time bearing information, determining, by the electronic device, a target picture corresponding to the target bearing based on the historical bearing information and the panoramic image; and displaying, by the electronic device, the target picture. In this way, even if the current bearing of the camera lens is not recorded in the historical bearing information, the electronic device can still estimate, based on a historical bearing that has been recorded in the historical bearing information, the target picture corresponding to the target bearing in the panoramic image, and display the target picture.

For example, the historical bearing information includes an included angle formed when the camera lens is rotated from a first historical bearing to a second historical bearing. In this case, the determining, by the electronic device, a target picture corresponding to the target bearing based on the historical bearing information and the panoramic image specifically includes: computing, by the electronic device based on the historical bearing information, a corresponding sub-picture in the panoramic image each time when the camera lens is rotated by a unit angle, in this way, the electronic device may use a sub-picture corresponding to the target bearing as the target picture.

In a possible design method, after the displaying, by the electronic device, the target picture, the method further includes: adding, by the electronic device to the target picture, an orientation identifier used to indicate the target bearing, to notify the user of an orientation of a currently displayed target picture.

In a possible design method, before the obtaining, by an electronic device, a first instruction triggered by a user, the method further includes: obtaining, by the electronic device, a second instruction triggered by the user, where the second instruction is used to instruct the electronic device to shoot the panoramic image; in response to the second instruction, obtaining, by the electronic device, the historical bearing information of the camera lens in a shooting process of the panoramic image; and adding, by the electronic device, the historical bearing information to EXIF information of the panoramic image.

In a possible design method, the method further includes: obtaining, by the electronic device, current real-time bearing information of the camera lens and historical bearing information of each of N images, where N is an integer greater than 0; and displaying, by the electronic device, K images whose historical bearing information is the same as the real-time bearing information in the N images, where K is an integer greater than or equal to 0. Therefore, a bearing of the camera lens that is measured when an image is displayed is compared with a bearing of the camera lens that is measured when the image is shot, to display, for the user, all images corresponding to a current orientation of the electronic device, so that the user can obtain, by adjusting a current bearing of the camera lens, a group of images having same historical bearing information.

According to a second aspect, this application provides an image display method, including: obtaining, by an electronic device, a first instruction triggered by a user, where the first instruction is used to instruct the electronic device to display a target image; in response to the first instruction, obtaining, by the electronic device, bearing information of a camera lens that is measured when the target image is shot, where the bearing information is used to indicate a bearing of the camera lens that is measured when the target image is shot; and when displaying the target image, adding, by the electronic device, an orientation identifier to a displayed picture based on the bearing information, where the orientation identifier includes at least one of a first identifier and a second identifier, the first identifier is used to indicate the bearing of the camera lens that is measured when the target image is shot, and the second identifier is used to indicate an orientation of a shot object in the target image.

In this way, while the target image is displayed, an orientation identifier of a shooting orientation of the target image may alternatively be displayed, so that the user can accurately learn of a specific shooting scenario from the orientation identifier and obtain information required by the user.

In a possible design method, before the obtaining, by an electronic device, a first instruction triggered by a user, the method further includes: obtaining, by the electronic device, a second instruction triggered by the user, where the second instruction is used to instruct the electronic device to shoot the target image by using the camera lens; in response to the second instruction, determining, by the electronic device, the bearing information of the camera lens that is measured when the target image is shot; and adding, by the electronic device, the bearing information to EXIF information of the target image.

When the electronic device displays the target image, the bearing information of the camera lens that is measured when the target image is shot may be obtained by reading the EXIF information of the target image. Further, the orientation identifier corresponding to the bearing information may be added to the displayed picture.

In a possible design method, the determining, by the electronic device, the bearing information of the camera lens that is measured when the target image is shot includes: obtaining, by the electronic device by using an electronic compass, orientation information currently indicated by the electronic compass. Because an arrangement position of the used camera lens on the electronic device during shooting is fixed, the electronic device may determine, based on the orientation information and the arrangement position of the camera lens on the electronic device, the bearing information of the camera lens that is measured when the target image is shot. In this way, an existing electronic compass can still be used to add the bearing information, thereby reducing implementation complexity of the foregoing image display method.

In a possible design method, the orientation identifier is the first identifier; and the adding, by the electronic device, an orientation identifier to a displayed picture based on the bearing information includes: generating, by the electronic device, the first identifier corresponding to the bearing information; and adding, by the electronic device, the first identifier to the displayed picture. In this case, the first identifier is used to indicate the bearing of the camera lens that is measured when the target image is shot.

In a possible design method, the orientation identifier is the second identifier; and the adding, by the electronic device, an orientation identifier to a displayed picture based on the bearing information includes: determining, by the electronic device, the orientation of the shot object in the target image based on the bearing information; generating, by the electronic device, the second identifier corresponding to the orientation of the shot object; and adding, by the electronic device, the second identifier to the displayed picture. In this case, the second identifier is used to indicate the orientation of the shot object in the target image. In this way, the electronic device can help the user determine a specific orientation of the shot object, and notify the user of the specific orientation in the displayed picture by using the orientation identifier, so that the user can accurately learn of a shooting scenario of the target image.

In a possible design method, the second instruction includes a panoramic photo shooting identifier; the determining, by the electronic device, the bearing information of the camera lens that is measured when the target image is shot includes: determining by the electronic device, start bearing information of the camera lens that is measured when the camera lens starts to shoot the target image and end bearing information of the camera lens that is measured when the camera lens finishes shooting the target image; and the adding, by the electronic device, an orientation identifier to a displayed picture based on the bearing information includes: adding, by the electronic device, a third identifier to the displayed picture, where the third identifier is used to indicate the start bearing information; and adding, by the electronic device, a fourth identifier to the displayed picture, where the fourth identifier is used to indicate the end bearing information.

In this way, while the target image in a panorama mode is displayed, an orientation identifier of each shooting orientation of the target image may alternatively be displayed, so that the user can accurately learn of a panoramic photo shooting scenario from the orientation identifier.

In a possible design method, the adding, by the electronic device, a third identifier to the displayed picture includes: when displaying the first frame of image in the target image, adding, by the electronic device, the third identifier to the first frame of image; and the adding, by the electronic device, a fourth identifier to the displayed picture includes: when displaying the last frame of image in the target image, adding, by the electronic device, the fourth identifier to the last frame of image. In this way, when a panoramic target image is played in full screen, a direction identifier corresponding to a bearing measured when the displayed picture is shot can be added to the corresponding displayed picture.

In a possible design method, the method further includes: obtaining, by the electronic device, current bearing information of the camera lens; and if the current bearing information of the camera lens is the same as the start bearing information, displaying, by the electronic device, the first frame of image in the target image; or if the current bearing information of the camera lens is the same as the end bearing information, displaying, by the electronic device, the last frame of image in the target image.

In a moving process of the electronic device, the electronic device may display, frame by frame based on the current bearing information of the camera lens, pictures whose bearing information is the same as the current bearing information and that are obtained when the target image is shot, so that the user can fully learn of a panoramic photo shooting scenario of the target image.

In a possible design method, the method further includes: obtaining, by the electronic device, a third instruction triggered by the user, where the third instruction is used to instruct the electronic device to classify N stored images, and N is an integer greater than 0; and in response to the third instruction, classifying, by the electronic device, the N images into M image sets based on bearing information of each image, where all images in each image set have same bearing information, and M is an integer greater than 0.

According to a third aspect, this application provides an electronic device, including: an obtaining unit, configured to: obtain a first instruction triggered by a user, where the first instruction is used to instruct the electronic device to display a panoramic image; and in response to the first instruction, obtain historical bearing information and real-time bearing information of a camera lens of the electronic device, where the historical bearing information is used to indicate a historical bearing of the camera lens that is measured when the panoramic image is shot, and the real-time bearing information is used to indicate a current target bearing of the camera lens; and a display unit, configured to: when the historical bearing information includes the target bearing, display a target picture corresponding to the target bearing in the panoramic image.

In a possible design method, the electronic device further includes a determining unit, where the determining unit is configured to: when the historical bearing information does not include the target bearing indicated by the real-time bearing information, determine a target picture corresponding to the target bearing based on the historical bearing information and the panoramic image; and the display unit is further configured to display the target picture.

In a possible design method, the historical bearing information includes an included angle formed when the camera lens is rotated from a first historical bearing to a second historical bearing; and the determining unit is specifically configured to: compute, based on the historical bearing information, a corresponding sub-picture in the panoramic image each time when the camera lens is rotated by a unit angle; and use a sub-picture corresponding to the target bearing as the target picture.

In a possible design method, the display unit is further configured to add, to the target picture, an orientation identifier used to indicate the target bearing.

In a possible design method, the electronic device further includes an adding unit; the obtaining unit is further configured to: obtain a second instruction triggered by the user, where the second instruction is used to instruct the electronic device to shoot the panoramic image; and in response to the second instruction, obtain the historical bearing information of the camera lens in a shooting process of the panoramic image; and the adding unit is configured to add the historical bearing information to image file format EXIF information of the panoramic image.

In a possible design method, the obtaining unit is further configured to obtain current real-time bearing, information of the camera lens and historical bearing information of each of N images, where N is an integer greater than 0; and the display unit is further configured to display K images whose historical bearing information is the same as the real-time bearing information in the N images, where K is an integer greater than or equal to 0.

According to a fourth aspect, this application provides an electronic device, including: an obtaining unit, configured to: obtain a first instruction triggered by a user, where the first instruction is used to instruct the electronic device to display a target image; and in response to the first instruction, obtain bearing information of a camera lens that is measured when the target image is shot, where the bearing information is used to indicate a bearing of the camera lens that is measured when the target image is shot; and an adding unit, configured to: when the target image is displayed in a displayed picture, add an orientation identifier to the displayed picture based on the bearing information, where the orientation identifier includes at least one of a first identifier and a second identifier, the first identifier is used to indicate the bearing of the camera lens that is measured when the target image is shot, and the second identifier is used to indicate an orientation of a shot object in the target image.

In a possible design method, the electronic device further includes a determining unit; the obtaining unit is further configured to obtain a second instruction triggered by the user, where the second instruction is used to instruct the electronic device to shoot the target image by using the camera lens; the determining unit is configured to: in response to the second instruction, determine bearing information of the camera lens that is measured when the target image is shot; and the adding unit is further configured to add the bearing information to EXIF information of the target image.

In a possible design method, the determining unit is specifically configured to: obtain, by using an electronic compass, orientation information currently indicated by the electronic compass; and determine, based on the orientation information and an arrangement position of the camera lens on the electronic device, the bearing information of the camera lens that is measured when the target image is shot.

In a possible design method, the adding unit is specifically configured to generate the first identifier corresponding to the bearing information, and add the first identifier to the displayed picture.

In a possible design method, the adding unit is specifically configured to: determine the orientation of the shot object in the target image based on the bearing information; generate the second identifier corresponding to the orientation of the shot object; and add the second identifier to the displayed picture.

In a possible design method, the second instruction includes a panoramic photo shooting identifier; the determining unit is specifically configured to determine start bearing information of the camera lens that is measured when the camera lens starts to shoot the target image and end bearing information of the camera lens that is measured when the camera lens finishes shooting the target image; and the adding unit is specifically configured to: add a third identifier to the displayed picture, where the third identifier is used to indicate the start bearing information; and add a fourth identifier to the displayed picture, where the fourth identifier is used to indicate the end bearing information.

In a possible design method, the adding unit is specifically configured to: when the first frame of image in the target image is displayed, add the third identifier to the first frame of image; and when the last frame of image in the target image is displayed, add the fourth identifier to the last frame of image.

In a possible design method, the obtaining unit is further configured to obtain current bearing information of the camera lens; and the adding unit is specifically configured to: if the current bearing information of the camera lens is the same as the start bearing information, display the first frame of image in the target image; or if the current bearing information of the camera lens is the same as the end bearing information, display the last frame of image in the target image.

In a possible design method, the electronic device further includes a classification unit, where the obtaining unit is further configured to obtain a third instruction triggered by the user, where the third instruction is used to instruct the electronic device to classify N stored images, and N is an integer greater than 0; and the classification unit is configured to: in response to the third instruction, classify the N images into M image sets based on bearing information of each image, where all images in each image set have same bearing information, and M is an integer greater than 0.

According to a fifth aspect, this application provides an electronic device, including: a display, an input interface, a processor, and a camera lens, where the input interface is configured to obtain a first instruction triggered by a user, where the first instruction is used to instruct the electronic device to display a panoramic image; the processor is configured to obtain historical bearing information and real-time bearing information of a camera lens of the electronic device, where the historical bearing information is used to indicate a historical bearing of the camera lens that is measured when the panoramic image is shot, and the real-time bearing information is used to indicate a current target bearing of the camera lens; and the processor is further configured to: when the historical bearing information includes the target bearing, control the display to display a target picture corresponding to the target bearing in the panoramic image.

In a possible design method, the processor is further configured to: when the historical bearing information does not include the target bearing indicated by the real-time bearing information, determine a target picture corresponding to the target bearing based on the historical bearing information and the panoramic image; and control the display to display the target picture.

In a possible design method, the historical bearing information includes an included angle formed when the camera lens is rotated from a first historical bearing to a second historical bearing; and the determining, by the electronic device, a target picture corresponding to the target bearing based on the historical bearing information and the panoramic image specifically includes: computing, by the processor based on the historical bearing information, a corresponding sub-picture in the panoramic image each time when the camera lens is rotated by a unit angle; using, by the processor, a sub-picture corresponding to the target bearing as a target sub-picture; and determining, by the processor, a picture including the target sub-picture as the target picture.

In a possible design method, the processor is further configured to control the display to add, to the target picture, an orientation identifier used to indicate the target bearing.

In a possible design method, the input interface is further configured to obtain a second instruction triggered by the user, where the second instruction is used to instruct the electronic device to shoot the panoramic image; and the processor is further configured to: obtain the historical bearing information of the camera lens in a shooting process of the panoramic image; and add the historical bearing information to image file format EXIF information of the panoramic image.

In a possible design method, the processor is further configured to obtain current real-time bearing information of the camera lens and historical bearing information of each of N images, where N is an integer greater than 0; and control the display to display K images whose historical bearing information is the same as the real-time bearing information in the N images, where K is an integer greater than or equal to 0.

According to a sixth aspect, this application provides an electronic device, including: a display, an input interface, a camera lens, and a processor, where the input interface is configured to obtain a first instruction triggered by a user, where the first instruction is used to instruct the electronic device to display a target image; the processor is configured to: in response to the first instruction, obtain bearing information of the camera lens that is measured when the target image is shot, where the bearing information is used to indicate a bearing of the camera lens that is measured when the target image is shot; and the processor is further configured to: when the target image is displayed in the display, add an orientation identifier to a displayed picture based on the bearing information, where the orientation identifier includes at least one of a first identifier and a second identifier, the first identifier is used to indicate the bearing of the camera lens that is measured when the target image is shot, and the second identifier is used to indicate an orientation of a shot object in the target image.

In a possible design method, the input interface is further configured to obtain a second instruction triggered by the user, where the second instruction is used to instruct the electronic device to shoot the target image by using the camera lens; and the processor is further configured to: in response to the second instruction, determine bearing information of the camera lens that is measured when the target image is shot; and add the bearing information to EXIF information of the target image.

In a possible design method, the electronic device further includes an electronic compass, where the electronic compass is configured to obtain current orientation information; and the processor is further configured to determine, based on the orientation information and an arrangement position of the camera lens on the electronic device, the bearing information of the camera lens that is measured when the target image is shot.

In a possible design method, the processor is specifically configured to generate the first identifier corresponding to the bearing information, and add the first identifier to the displayed picture.

In a possible design method, the processor is specifically configured to: determine the orientation of the shot object in the target image based on the bearing information; generate the second identifier corresponding to the orientation of the shot object; and add the second identifier to the displayed picture.

In a possible design method, the processor is further configured to determine start bearing information of the camera lens that is measured when the camera lens starts to shoot the target image and end bearing information of the camera lens that is measured when the camera lens finishes shooting the target image; and the display is further configured to: add a third identifier to the displayed picture, where the third identifier is used to indicate the start bearing information; and add a fourth identifier to the displayed picture, where the fourth identifier is used to indicate the end bearing information.

In a possible design method, the display is specifically configured to: when the first frame of image in the target image is displayed, add the third identifier to the first frame of image; and when the last frame of image in the target image is displayed, add the fourth identifier to the last frame of image.

In a possible design method, the input interface is further configured to obtain current bearing information of the camera lens; and the display is further configured to: if the current bearing information of the camera lens is the same as the start bearing information, display the first frame of image in the target image; or if the current bearing information of the camera lens is the same as the end bearing information, display the last frame of image in the target image.

In a possible design method, the input interface is further configured to obtain a third instruction triggered by the user, where the third instruction is used to instruct the electronic device to classify N stored images, and N is an integer greater than 0; and the processor is further configured to: in response to the third instruction, classify the N images into M image sets based on bearing information of each image, where all images in each image set have same bearing information, and M is an integer greater than 0.

According to a seventh aspect, an embodiment of this application provides a computer-readable storage medium, where the computer-readable storage medium stores an instruction, and when the instruction runs on any one of the foregoing electronic devices, the electronic device performs any one of the foregoing image display methods.

According to an eighth aspect, an embodiment of this application provides a computer program product including an instruction, where when the instruction runs on any one of the foregoing electronic devices, the electronic device performs any one of the foregoing image display methods.

In the embodiments of this application, names of the foregoing electronic devices do not constitute any limitation on the devices. During actual implementation, these devices may have other names. Any device whose function is similar to that in the embodiments of this application falls within the scope defined by the claims of this application and their equivalent technologies.

In addition, for technical effects brought by any design method according to the third aspect to the eighth aspect, refer to technical effects brought by different design methods in the first aspect. Details are not described herein again.

DESCRIPTION OF EMBODIMENTS

The following describes the technical solutions in the embodiments of this application in detail with reference to the accompanying drawings in the embodiments of this application.

Figure 22:
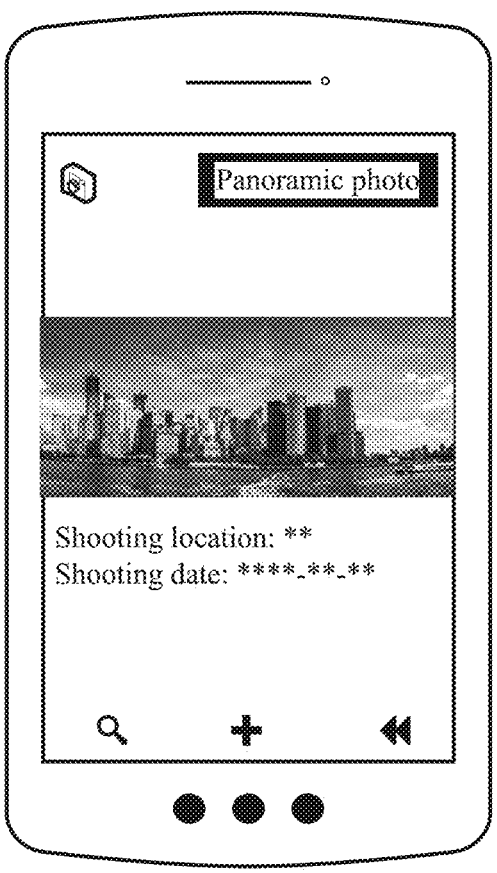
FIG. 22 is a display interface diagram of a panoramic image in the prior art.

Currently, as shown in FIG. 22, when displaying a panoramic image, for example, a panoramic photo, an electronic device usually presents the complete panoramic image to a user as a thumbnail. The user can resize the panoramic photo through operations such as dragging and double tapping, to view details at a specific location of the panoramic photo. However, these operations make it quite inconvenient for the user to view a picture at a specific location of the panoramic photo, causing poor user experience.

Therefore, in an image display method provided in an embodiment of the present invention, when displaying a panoramic image, an electronic device may be triggered to obtain current real-time bearing information of a camera lens of the electronic device (for example, the real-time bearing information indicates that a current bearing of the camera lens is the north direction) and historical bearing information of the camera lens that is recorded when the panoramic image is shot (for example, the historical bearing information indicates that the camera lens is rotated by 90° from north to east).

In this way, the electronic device can determine whether the historical bearing information includes a target bearing indicated by the real-time bearing information. For example, if the target bearing indicated by the real-time bearing information is the north direction, and the historical bearing information indicates that the camera lens is rotated by 90° from north to east, the historical bearing information includes the north direction indicated by the real-time bearing information. In this case, the electronic device may present a target picture corresponding to the target bearing, namely, the north direction, in the panoramic image to the user, so that the user can automatically obtain a picture corresponding to the current bearing from the panoramic image based on the current bearing of the camera lens, thereby improving user experience of panoramic image displaying.

The panoramic image may also be referred to as a panoramic photo (panoramic photography) or a panorama, and is generally an image shot within a range of a normal effective visual angle (for example, 90 degrees horizontal) of human eyes or a wider field of view (for example, 180 degrees or even 360 degrees horizontal).

Figure 33:
FIG. 33 is a schematic diagram 23 of an application scenario of an image display method according to an embodiment of this application.

Currently, many intelligent devices provide a panoramic photo shooting function. In addition, many online map service providers provide functions such as "street view" and "live view", so that a user can browse photos of scenes in a 360-degree range around a place. These photos also belong to the panoramic image described in the embodiments of the present invention. For example, an image displayed by using a "street view" function provided by an online map service provider shown in FIG. 33 may be used as the panoramic image.

In the embodiments of the present invention, the panoramic image may be stored as a single file, or may be stored as a plurality of files, for example, a plurality of picture files constituting the panoramic image, and these files may be stored in a same folder.

Figure 23:
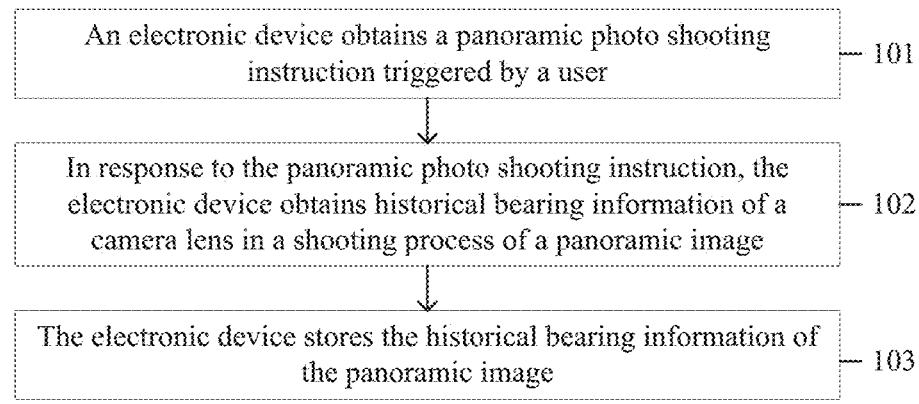
FIG. 23 is a schematic flowchart 3 of an image display method according to an embodiment of this application.

The following describes an image display method according to an embodiment of this application in detail with reference to specific embodiments. As shown in FIG. 23, the method includes the following steps.

101. An electronic device obtains a panoramic photo shooting instruction triggered by a user.

For example, when the user enables a panoramic photo shooting function of the electronic device, the electronic device enters a shooting interface, and if the user triggers a shutter button in the shooting interface, the electronic device generates a shooting instruction in response to a button operation currently triggered by the user, to instruct the electronic device to store, in a panorama mode, a picture currently captured by a camera lens and generate a panoramic image.

Usually, the generated panoramic image is obtained by compositing, in a shooting order, a plurality of images shot in a shooting process. A specific composition method of the images is not limited in any manner in this embodiment of the present invention.

102. In response to the panoramic photo shooting instruction, the electronic device obtains historical bearing information of a camera lens in a shooting process of a panoramic image.

Specifically, after obtaining the shooting instruction, the electronic device is triggered to start to shoot the panoramic image. However, a difference from the prior art is that, in the shooting process, the electronic device may obtain the historical bearing information of the camera lens in the shooting process by using an electronic compass of the electronic device.

Figure 15:
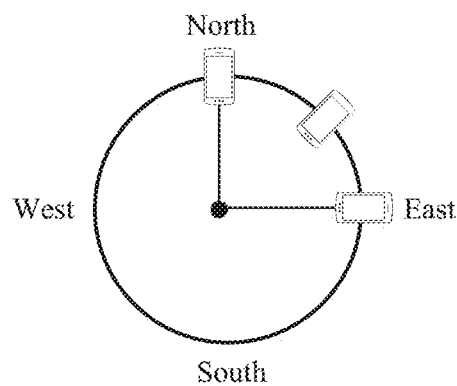
FIG. 15 is a schematic diagram 10 of an application scenario of an image display method according to an embodiment of this application.

For example, as shown in FIG. 15, when the user triggers the shutter button for the first time (in other words, the user starts to shoot a panoramic picture), the electronic device may determine, by using the electronic compass, start bearing information of the camera lens, for example, the north direction, measured when starting to shoot the panoramic image; and when the user triggers the shutter button for the second time (in other words, the user finishes shooting the panoramic picture), the electronic device may still determine, by using the electronic compass, end bearing information of the camera lens, for example, the east direction, measured when finishing shooting the panoramic image. In other words, the user shoots the panoramic image by rotating the electronic device by 90° from north to east. In this case, the historical bearing information obtained by the electronic device includes the start bearing information and the end bearing information.

Alternatively, the electronic device usually shoots a plurality of images continuously when shooting the panoramic image, and when each image is shot, the electronic device may be triggered to determine bearing information of the camera lens by using the electronic compass of the electronic device. If the electronic device shoots X (X>1) images in total when shooting the panoramic image, the historical bearing information obtained by the electronic device includes bearing information corresponding to each image, in other words, the historical bearing information includes X pieces of bearing information.

103. The electronic device stores the historical bearing information of the panoramic image.

Figure 2:
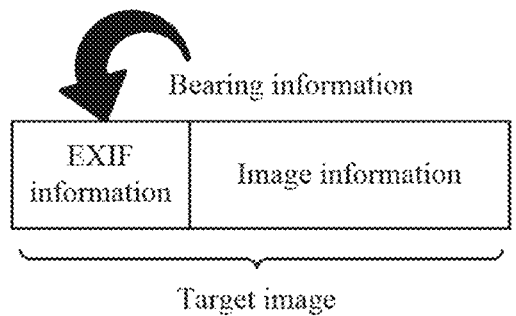
FIG. 2 is a schematic diagram of a format of bearing information according to an embodiment of this application.

For example, as shown in FIG. 2, some shooting-related attribute information, such as an aperture, a shutter, white balance, light sensitivity, a focal length, and a date during shooting, a camera brand and model, and GPS data, is added to a header of image information of a picture in an EXIF (exchangeable image file, Exchangeable Image File) format, and may be referred to as EXIF information in this embodiment of this application. In this embodiment of the present invention, the electronic device may add the historical bearing information obtained in step 102 to the EXIF information of the panoramic image, and store the panoramic image in the EXIF format.

Alternatively, a dedicated part may be further divided from storage space of the electronic device to store historical bearing information of different images (including the panoramic image). In this case, an identifier of a picture corresponding to each piece of historical bearing information may be added to each piece of historical bearing information, to differentiate between historical bearing information of images.

Further, when an image shot by the electronic device is the panoramic image, historical bearing information of the panoramic image usually includes a plurality of pieces of bearing information. For example, the electronic device records bearing information corresponding to each image in the panoramic image when shooting the image. While storing the historical bearing information of the panoramic image, the electronic device may further record a correspondence between each piece of bearing information in the historical bearing information and a corresponding image.

For example, when storing the panoramic image, the electronic device may directly stitch a plurality of shot images and store the images in a form of a panoramic photo. In this case, as shown in a part (a) of FIG. 24, the electronic device continuously shoots three images from north to east when shooting the panoramic image, stitches the three images into one panoramic image, and then stores the panoramic image, corresponding historical bearing information is recorded when each image is shot, and during stitching, the electronic device may determine a specific location of each image in the panoramic image. Therefore, the electronic device may obtain a picture corresponding to each piece of bearing information in the historical bearing information in the panoramic photo.

Figure 24:
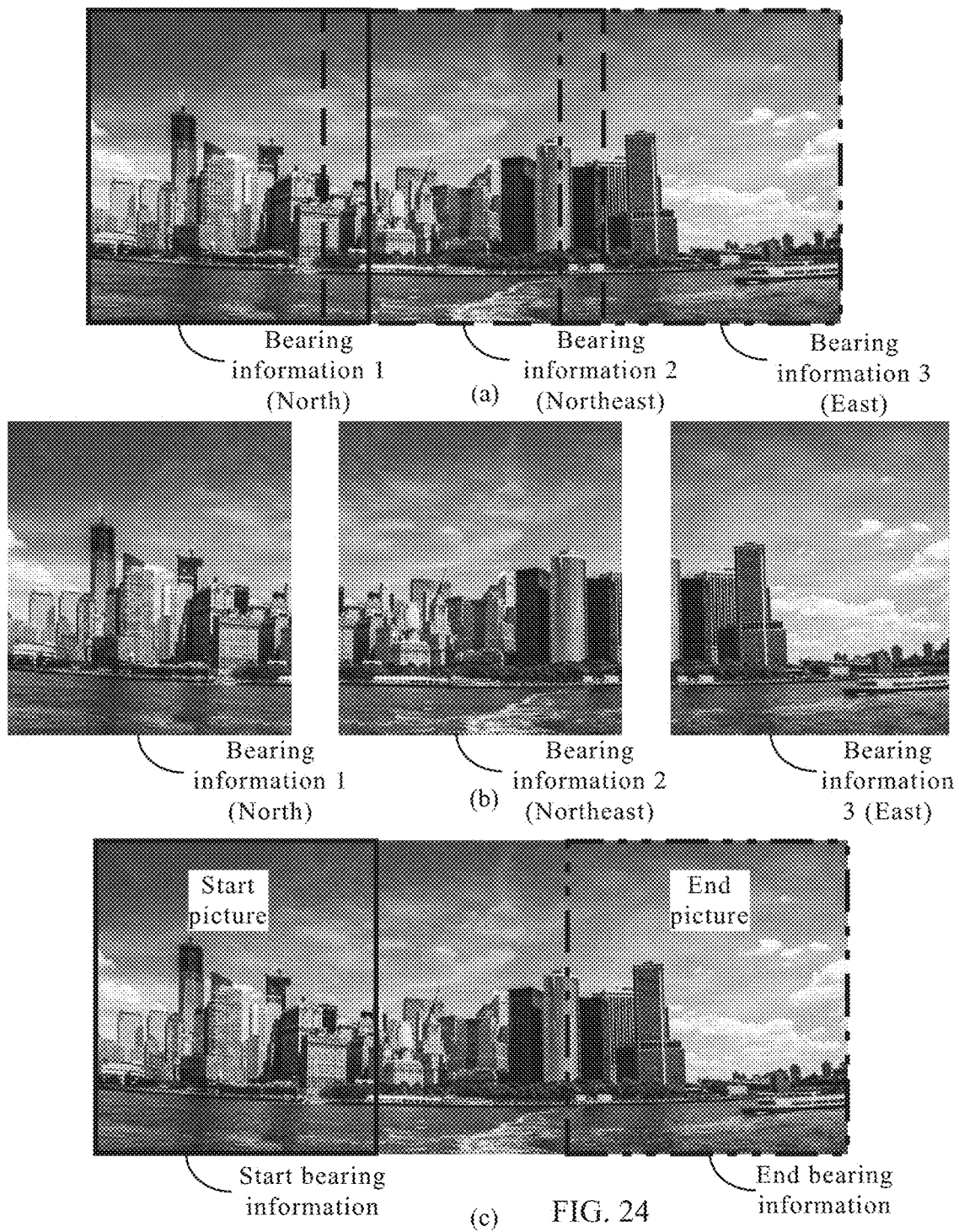
FIG. 24 is a schematic diagram 15 of an application scenario of an image display method according to an embodiment of this application.

Alternatively, when storing the panoramic image, the electronic device may store a plurality of shot images in a shooting order (for example, three images shown in a part (b) of FIG. 24); and when displaying the panoramic image subsequently, the electronic device stitches the plurality of images into one panoramic image. Still as shown in the part (b) of FIG. 24, while storing the three images, the electronic device may directly record a correspondence between each image and corresponding bearing information.

Certainly, when shooting the panoramic image, the electronic device may alternatively record only bearing information of the camera lens in several orientations in the shooting process. For example, the electronic device may record the start bearing information and the end bearing information. In this case, as shown in a part (c) of FIG. 24, the electronic device needs to record only a correspondence between the start bearing information and a start picture in the panoramic image and a correspondence between the end hearing information and an end picture in the panoramic image. This is not limited in any manner in this embodiment of the present invention.

Figure 25:
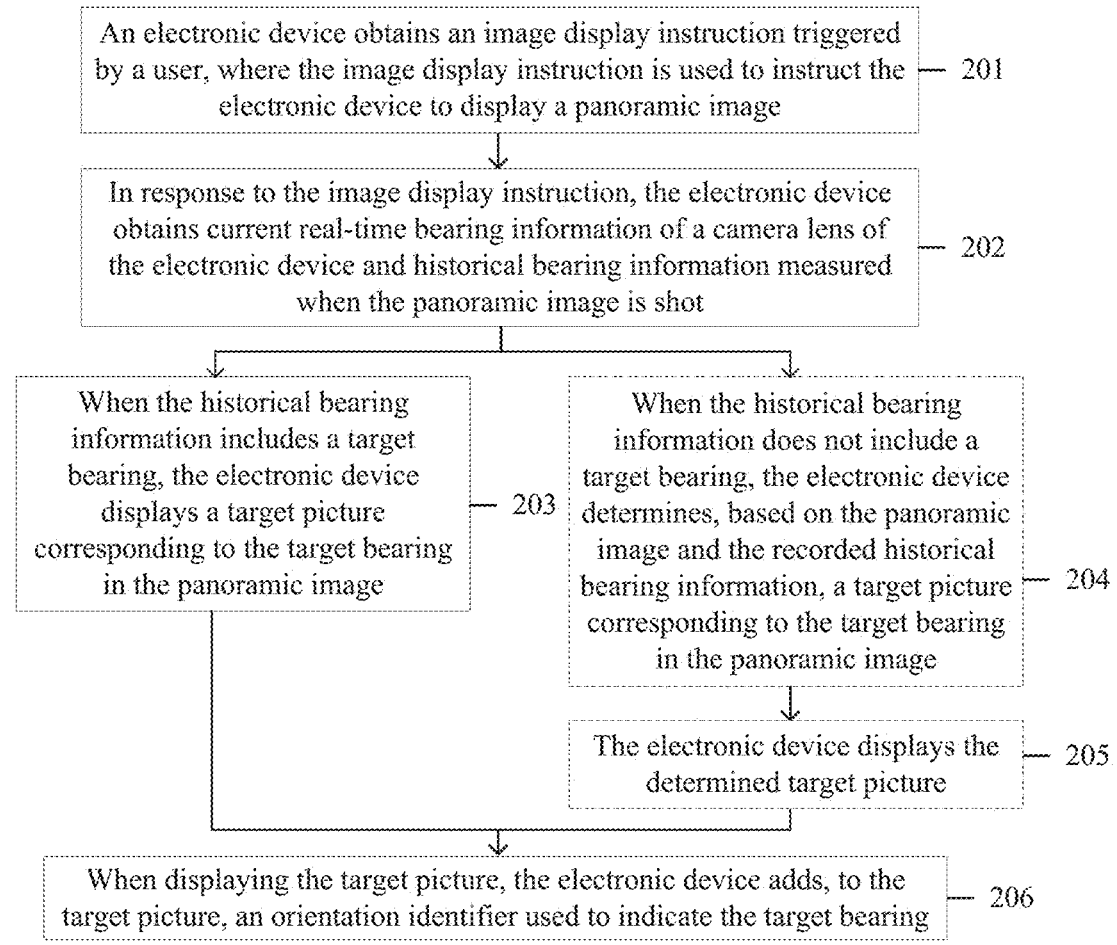
FIG. 25 is a schematic flowchart 4 of an image display method according to an embodiment of this application.

Another embodiment of this application provides an image display method. When a user views or browses a panoramic image on an electronic device, the electronic device may perform the following steps 201 to 205. As shown in FIG. 25, steps 201 to 205 are described below.

201. An electronic device obtains an image display instruction triggered by a user, where the image display instruction is used to instruct the electronic device to display a panoramic image.

Figure 26:
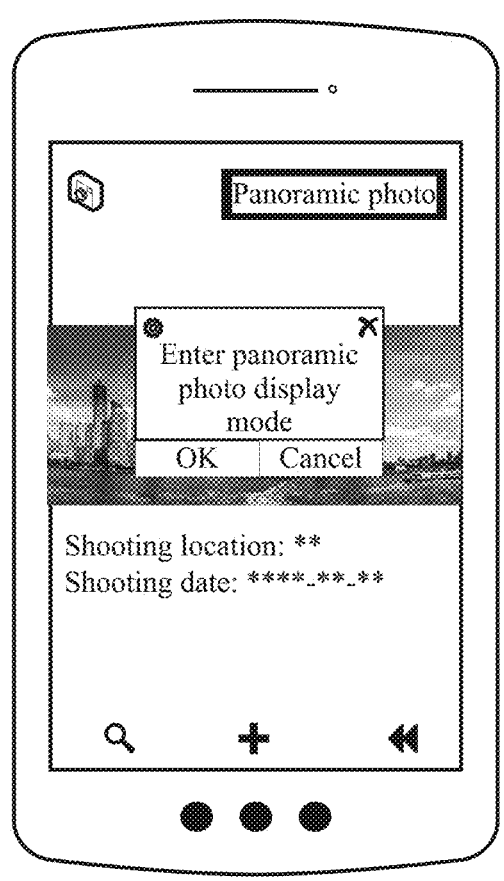
FIG. 26 is a schematic diagram 16 of an application scenario of an image display method according to an embodiment of this application.

For example, when the user opens a thumbnail of the panoramic image, the electronic device may be triggered to generate the image display instruction. In this case, as shown in FIG. 26, the electronic device may use a display window to prompt the user whether to enter a panoramic photo display mode. If the user determines to enter the panoramic photo display mode, the electronic device continues to perform the following steps 202 to 205; or if the user cancels entering of the panoramic photo display mode, the electronic device may display the panoramic image as a thumbnail according to the prior art.

For another example, the user may trigger, by tapping a "street view" or "live view" button on an online map, the electronic device to display a "street view" or "live view". As described above, a photo displayed by using a "street view" or "live view" function also belongs to the panoramic image described in this embodiment of the present invention.

Certainly, the electronic device may alternatively directly enter a full-screen display mode without confirmation of the user. This is not limited in any manner in this embodiment of the present invention.

202. In response to the image display instruction, the electronic device obtains current real-time bearing information of a camera lens of the electronic device and historical bearing information of the panoramic image.

After obtaining the image display instruction, the electronic device may be triggered to perform the following two actions: obtaining, from EXIF information of the panoramic image, historical bearing information recorded when the camera lens shoots the panoramic image; and obtaining current real-time bearing information of the camera lens by using an electronic compass.

Figure 27:
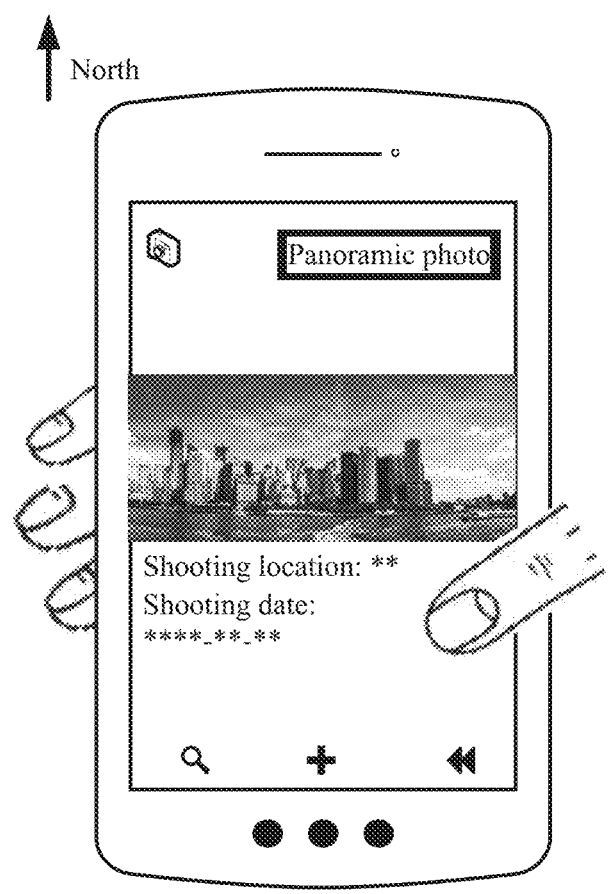
FIG. 27 is a schematic diagram 17 of an application scenario of an image display method according to an embodiment of this application.

For example, as shown in FIG. 27, after determining to enter the panoramic photo display mode, the user raises the electronic device. If a current bearing of the camera lens on the electronic device is the north direction, real-time bearing information obtained by the electronic device also indicates the north direction.

In addition, the electronic device may further obtain, from the EXIF information of the panoramic image, the historical bearing information recorded when shooting the panoramic image. For example, the historical bearing information includes north direction information measured when shooting of the panoramic image starts and east direction information measured when the shooting of the panoramic image ends.

Certainly, the historical bearing information may be obtained by using the electronic compass when the electronic device shoots the panoramic image, or may be manually entered after the panoramic image is obtained subsequently, or may be sent by another device to the electronic device. This is not limited in any manner in this embodiment of the present invention.

It should be noted that the electronic device may first obtain the real-time bearing information and then obtain the historical bearing information, or may first obtain the historical bearing information and then obtain the real-time bearing information, or may obtain the real-time bearing information and the historical bearing information at the same time. This is not limited in any manner in this embodiment of the present invention.

203. When the historical bearing information includes a target bearing indicated by the real-time bearing information, the electronic device displays a target picture corresponding to the target bearing in the panoramic image.

Specifically, the electronic device may compare the obtained real-time bearing information with the historical bearing information. The historical bearing information usually includes a plurality of bearings of the camera lens that are measured when the panoramic image is shot, and the real-time bearing information indicates only a current bearing (namely, the target bearing) of the camera lens. Therefore, the electronic device may determine, by searching the historical bearing information, whether the historical bearing information includes the target bearing.

The example in step 202 is still used for description. The historical bearing information includes the north direction information and the east direction information. Because the target bearing indicated by the real-time bearing information is the north direction, the electronic device may determine that the historical bearing information includes the target bearing (the north direction).

Figure 28:
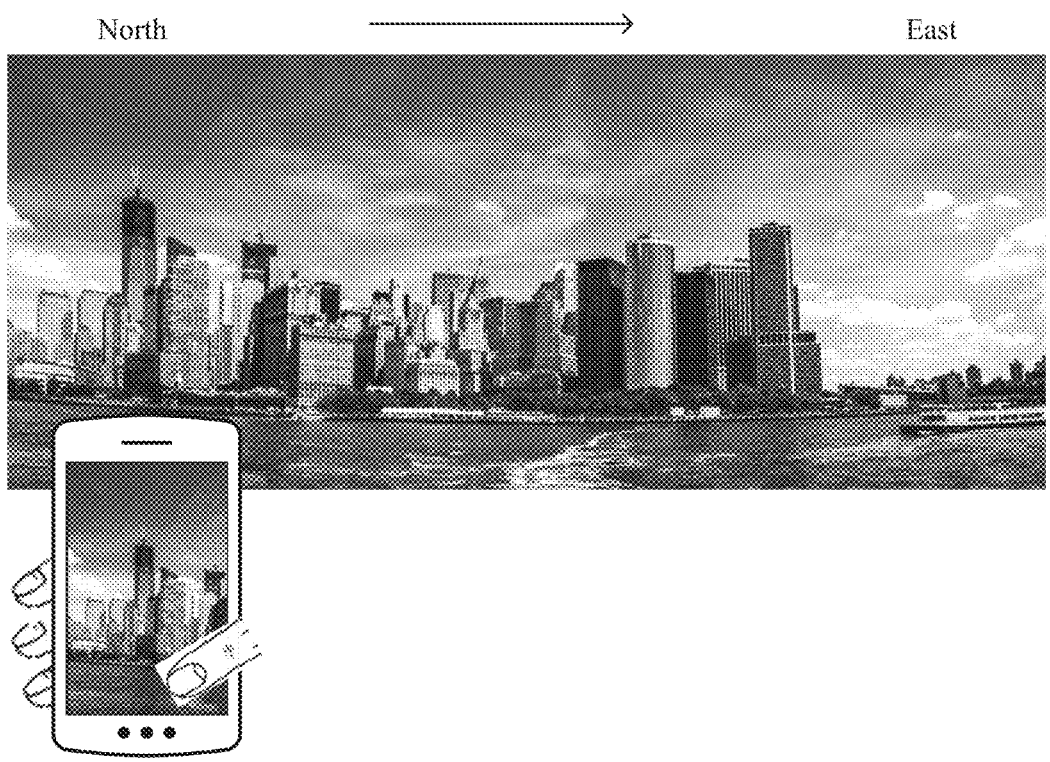
FIG. 28 is a schematic diagram 18 of an application scenario of an image display method according to an embodiment of this application.

In this case, in step 203, correspondences between different pieces of bearing information and corresponding images have been recorded in step 103. Therefore, as shown in FIG. 28, when the historical bearing information includes the target bearing indicated by the real-time bearing information, the electronic device may display, in full screen, a target picture that corresponds to the target bearing (the north direction) and that is in the panoramic image. In other words, the electronic device may display a shot picture obtained when the camera lens shoots the panoramic image in the north direction. In this way, the user can view a scene captured when the panoramic image is shot in the north direction.

In an embodiment, when a difference between the target bearing indicated by the real-time bearing information and a specific historical bearing indicated by the historical bearing information is within a preset range, it may be considered that the historical bearing information includes the target bearing. For example, the preset range is ±10°. If the target bearing indicated by the real-time bearing information is 30° east of north, and the historical hearing information records bearing information: 25° east of north, a difference between 30° east of north and 25° east of north is within ±10°. Therefore, the electronic device may determine that the historical bearing information includes the target bearing.

Optionally, the method further includes the following steps 204 to 205:

204. When the historical hearing information does not include a target bearing indicated by the real-time bearing information, the electronic device determines, based on the panoramic image and the recorded historical bearing information, a target picture corresponding to the target bearing in the panoramic image.

205. The electronic device displays the determined target picture.

If the historical bearing information does not include the target bearing indicated by the real-time bearing information, the electronic device may further determine, based on the panoramic image and the recorded historical bearing information, the target picture corresponding to the target bearing in the panoramic image.

For example, the electronic device may consider, by default, that when the user shoots the panoramic image from north to east, the electronic device is rotated at a constant speed. Further, the electronic device may compute a corresponding sub-picture in the panoramic image each time when the camera lens is rotated by one degree during the shooting of the panoramic image. In this way, the electronic device can determine a target sub-picture corresponding to the target bearing. Further, the electronic device may display, based on display specifications of a display of the electronic device, a target picture including the target sub-picture.

Figure 29:
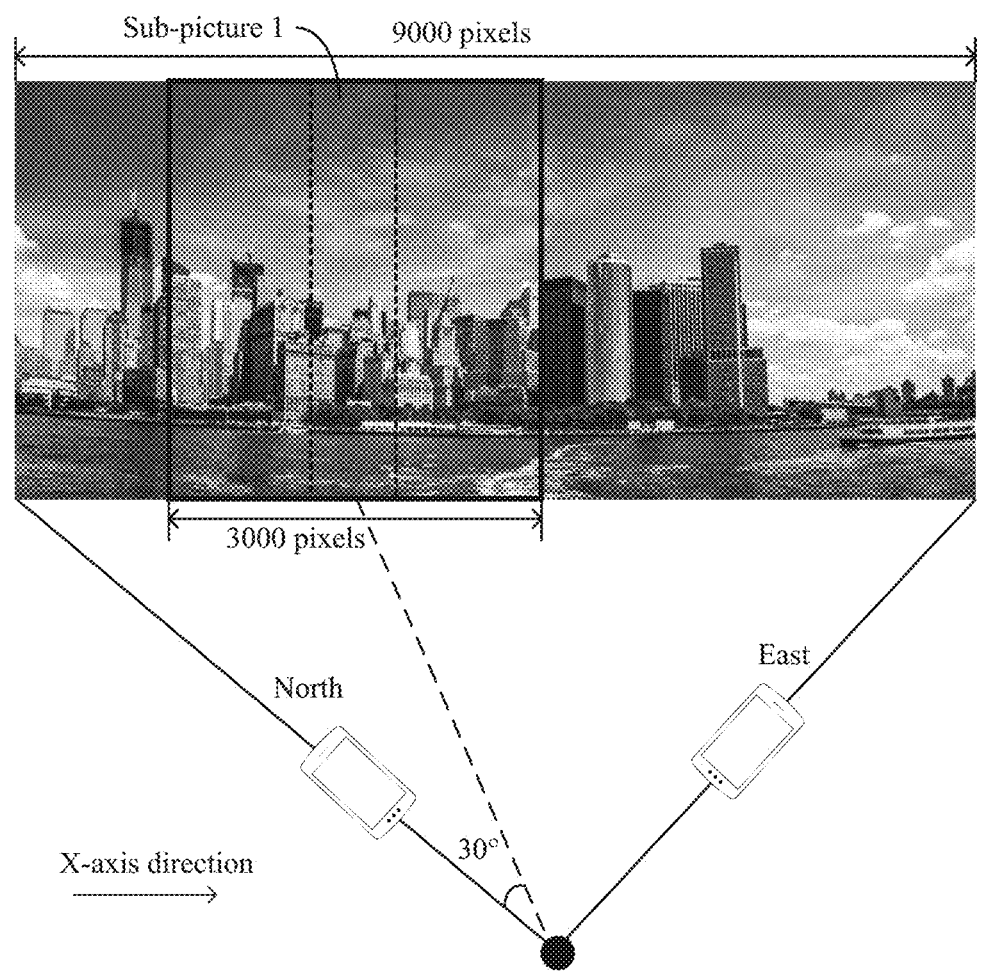
FIG. 29 is a schematic diagram 19 of an application scenario of an image display method according to an embodiment of this application.

For example, as shown in FIG. 29, the user shoots a panoramic image by rotating the camera lens by 90° from north to east, and the panoramic image includes 9000 pixels in an x-axis direction. Therefore, each time when the camera lens is rotated by 1°, the camera lens shoots a sub-picture that includes 100 pixels in the x-axis direction and that is in the panoramic image. When a current target bearing of the camera lens is 30° east of north, it can be determined that a target sub-picture shot when the camera lens is rotated by 30° is a sub-picture 1 including the 2900$^{th}$ pixel to the 3000$^{th}$ pixel. In this case, if the display of the electronic device can display 3000 pixels on the x-axis, the electronic device may use, as the target picture, a 3000-pixel picture with the sub-picture 1 at the center. Certainly, a person skilled in the art may understand that the electronic device can display any target picture that includes the target sub-picture, for example, a 2000-pixel picture that includes the sub-picture 1.

Figure 30:
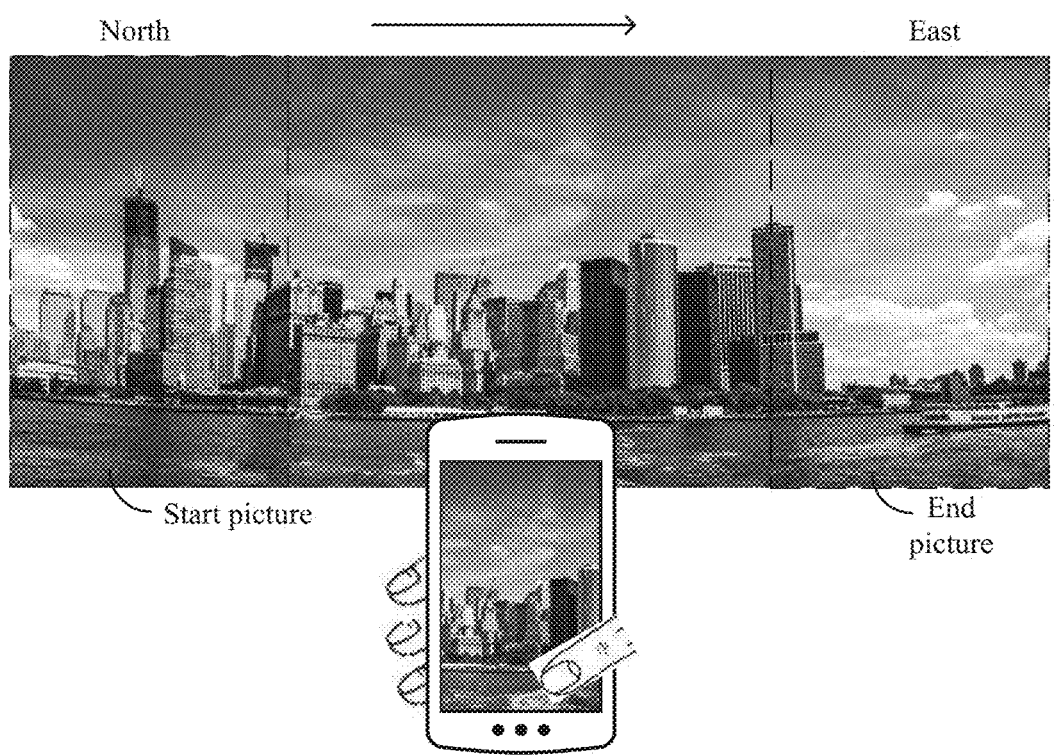
FIG. 30 is a schematic diagram 20 of an application scenario of an image display method according to an embodiment of this application.

Alternatively, as shown in FIG. 30, when the target bearing indicated by the real-time bearing information is the northeast direction, in other words, a current bearing of the camera lens of the electronic device is the northeast direction, and the historical bearing information does not record bearing information measured when the panoramic image is shot in the northeast direction, but records only north direction information measured when the shooting of the panoramic image starts and east direction information measured when the shooting of the panoramic image ends, the electronic device may use a middle picture between a start picture (the start picture corresponds to the north direction information) and an end picture (the end picture corresponds to the east direction information) as the target picture, and display the target picture in full screen.

Optionally, the method further includes the following step 206:

206. When displaying the target picture, the electronic device adds, to the target picture, an orientation identifier used to indicate the target bearing.

Figure 31:
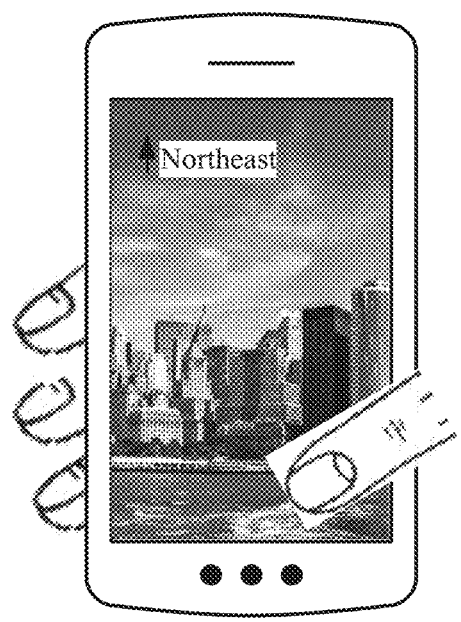
FIG. 31 is a schematic diagram 21 of an application scenario of an image display method according to an embodiment of this application.

As shown in FIG. 31, when displaying the target picture, the electronic device may further add, to the target picture, the orientation identifier used to indicate the target bearing, to notify the user of an orientation of the currently displayed target picture.

A person skilled in the art may set a specific form of the orientation identifier based on a practical application scenario and practical experience. This is not limited in any manner in this embodiment of the present invention.

Therefore, it can be learned from the image display method described in steps 201 to 206 that, in the image display method provided in this embodiment of the present invention, the electronic device may display, for the user in an image display process by comparing a bearing of the camera lens that is measured when the panoramic image is displayed and a bearing of the camera lens that is measured when the panoramic image is generated, a picture corresponding to a current orientation of the electronic device, so that a specific picture shot in the same orientation as the current orientation is more truly reproduced in a process of displaying the panoramic image, and the user has same experience of viewing a shot image as that of shooting the image.

An image display method provided in another embodiment of this application includes the following steps 301 to 303.

301. An electronic device obtains current real-time bearing information of a camera lens of the electronic device.

For example, a function button used for image classification may be set in a displayed picture of the electronic device. When a user triggers the function button, the electronic device may be triggered to generate an image classification instruction, and the image classification instruction may be used to instruct the electronic device to classify N (N>0) stored images.

The N images may be all images stored in the electronic device, or may be one or more images selected by the user from all the images. This is not limited in any manner in this embodiment of this application.

For a method in which the electronic device obtains the current real-time bearing information of the camera lens of the electronic device, refer to related descriptions in step 202. Details are not described herein again.

302. The electronic device obtains historical bearing information of each of the N images.

303. The electronic device displays K images whose historical bearing information is the same as the real-time bearing information in the N images, where K is an integer greater than or equal to 0.

The electronic device has stored, in EXIF information of each image, historical bearing information of the camera lens that is measured when the image is shot. Therefore, in step 303, the electronic device may compare the historical bearing information that is recorded in each of the N images and that is obtained in step 302 with the real-time bearing information obtained in step 301, to obtain K images whose historical bearing information is the same as the real-time bearing information.

Figure 32:
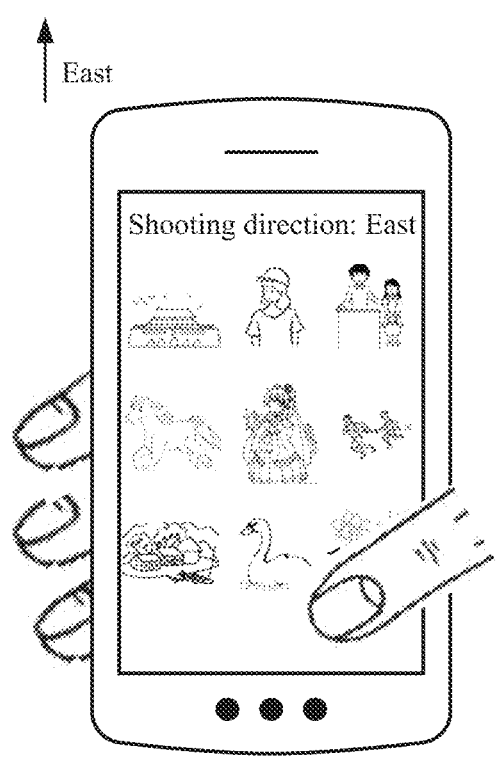
FIG. 32 is a schematic diagram 22 of an application scenario of an image display method according to an embodiment of this application.

As shown in FIG. 32, when a current bearing of the camera lens of the electronic device is the east direction, the electronic device may use all photos whose historical bearing information is also the east direction in a graphics library as the K images. Further, still as shown in FIG. 30, the electronic device may display the K images as thumbnails. In this way, the user can obtain, by adjusting a current bearing of the electronic device, a group of images having same historical bearing information measured when the images are shot.

Certainly, the word "same" in step 303 is not absolute. When a difference between a historical bearing indicated by the historical bearing information and a real-time bearing indicated by the real-time bearing information is less than a preset threshold, the electronic device may alternatively consider that the historical bearing information is the same as the real-time bearing information. This is not limited in any manner in this embodiment of the present invention.

Therefore, it can be learned from the image display method described in steps 301 to 303 that, in the image display method provided in this embodiment of the present invention, a bearing of the camera lens that is measured when an image is displayed is compared with a bearing of the camera lens that is measured when the image is shot, to display, for the user, all images corresponding to a current orientation of the electronic device, so that the user can obtain, by adjusting a current bearing of the camera lens, a group of images having same historical bearing information.

Figure 1:
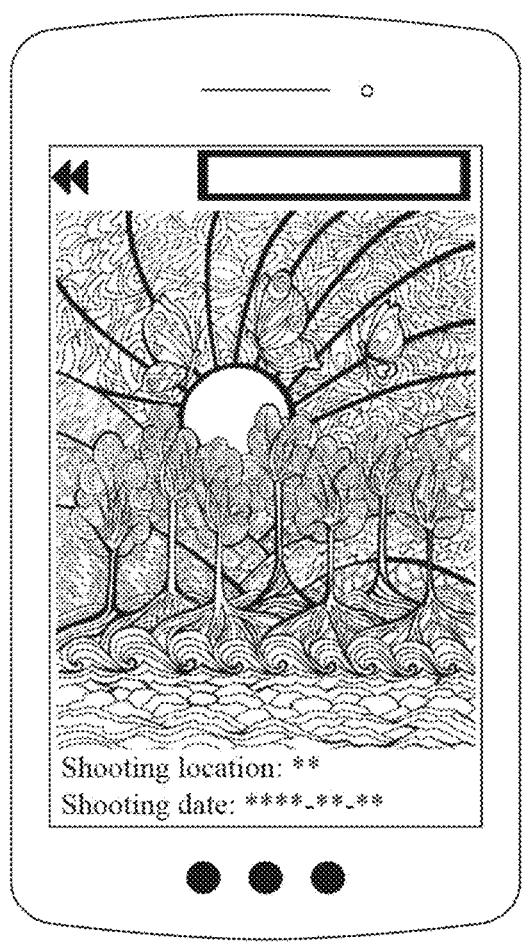
FIG. 1 shows an image display scenario in the prior art.

Currently, as shown in FIG. 1, the user may view a stored image on the electronic device by using an application such as Photos. While image content is displayed, some attribute information of the image may also be displayed in a displayed picture, for example, a shooting time and a shooting place. As shown in FIG. 1, the user may further view attribute information such as camera lens parameters (such as a value of a shutter speed and a value of a focal length) and image processing parameters (such as contrast, white balance, and saturation) in detailed information of the image. In this way, the user can learn, from the attribute information, of some shooting details of the image that are generated when the image is shot.

However, after the user shoots an image, and particularly, if the image is an image shot in an unfamiliar environment or scene, the user may want to learn, when viewing the image subsequently, a specific shooting orientation of the image or a specific orientation of an object in the image, to help the user accurately learn of shooting details of the image.

Therefore, in the image display method provided in this embodiment of this application, when the user triggers a photo shooting function of the electronic device, the electronic device may shoot a target image and determine bearing information of the camera lens that is measured when the target image is shot, namely, a bearing of the camera lens that is measured when the target image is shot. In this way, the electronic device may add the bearing information to attribute information of the target image. For example, the electronic device may add the bearing information to the EXIF information and store the target image in an EXIF format.

Figure 7:
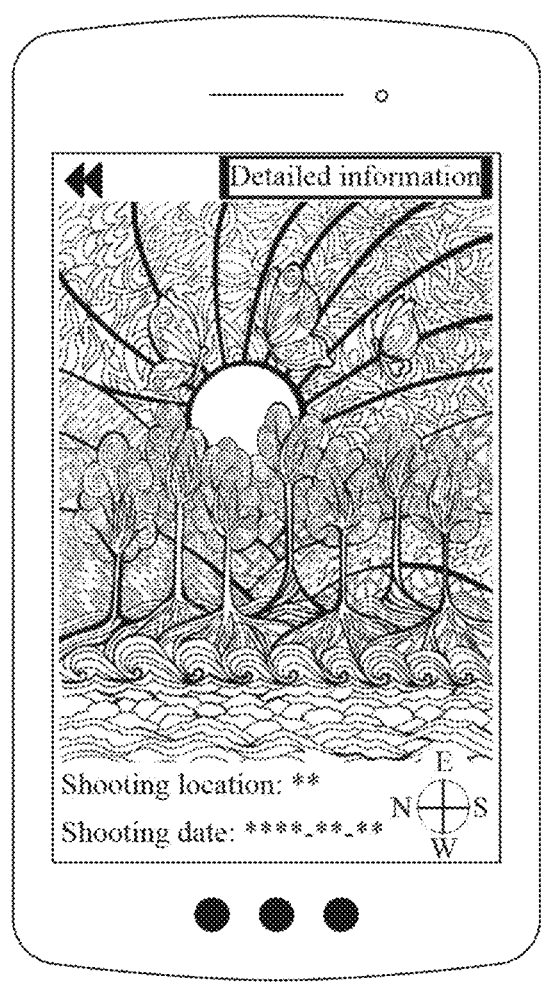
FIG. 7 is a schematic diagram 3 of an application scenario of an image display method according to an embodiment of this application.

When the electronic device displays the target image, the beating information of the camera lens that is measured when the target image is shot may be obtained by reading the EXIF information of the target image. Further, the orientation identifier corresponding to the bearing information may be added to the displayed picture. For example, as shown in FIG. 7, an identifier indicating four orientations of east, west, south, and north during shooting may be added.

In this way, while the target image is displayed, an orientation identifier of a shooting orientation of the target image may alternatively be displayed, so that the user can accurately learn of a specific shooting scenario from the orientation identifier and obtain information required by the user.

As shown in FIG. 2, some shooting-related attribute information is added to a header of image information of a picture in an EXIF format, and is referred to as EXIF information in this embodiment of this application. In other words, an image stored in the EXIF format includes image information (such as a gray-scale value of each pixel in the image) used to describe the image and attribute information of the image, namely, the EXIF information, such as an aperture, a shutter, white balance, light sensitivity, a focal length, and a date during shooting, a camera brand and model, a sound recorded during shooting, and GPS data.

In this embodiment of this application, as shown in FIG. 2, when shooting an image, the electronic device may obtain bearing information of the camera lens, and add the bearing information to EXIF information of the image, so that when the image is displayed subsequently, a corresponding orientation identifier is displayed by reading the bearing information.

Further, the electronic device may be specifically any device with an image display function, such as a mobile phone, a camera, a wearable device, an AR (augmented reality, augmented reality)/VR (virtual reality, virtual reality) device, a tablet computer, a notebook computer, a UMPC (ultra-mobile personal computer, ultra-mobile personal computer), a netbook, or a PDA (personal digital assistant, personal digital assistant). This is not limited in any manner in this embodiment of this application.

Figure 3:
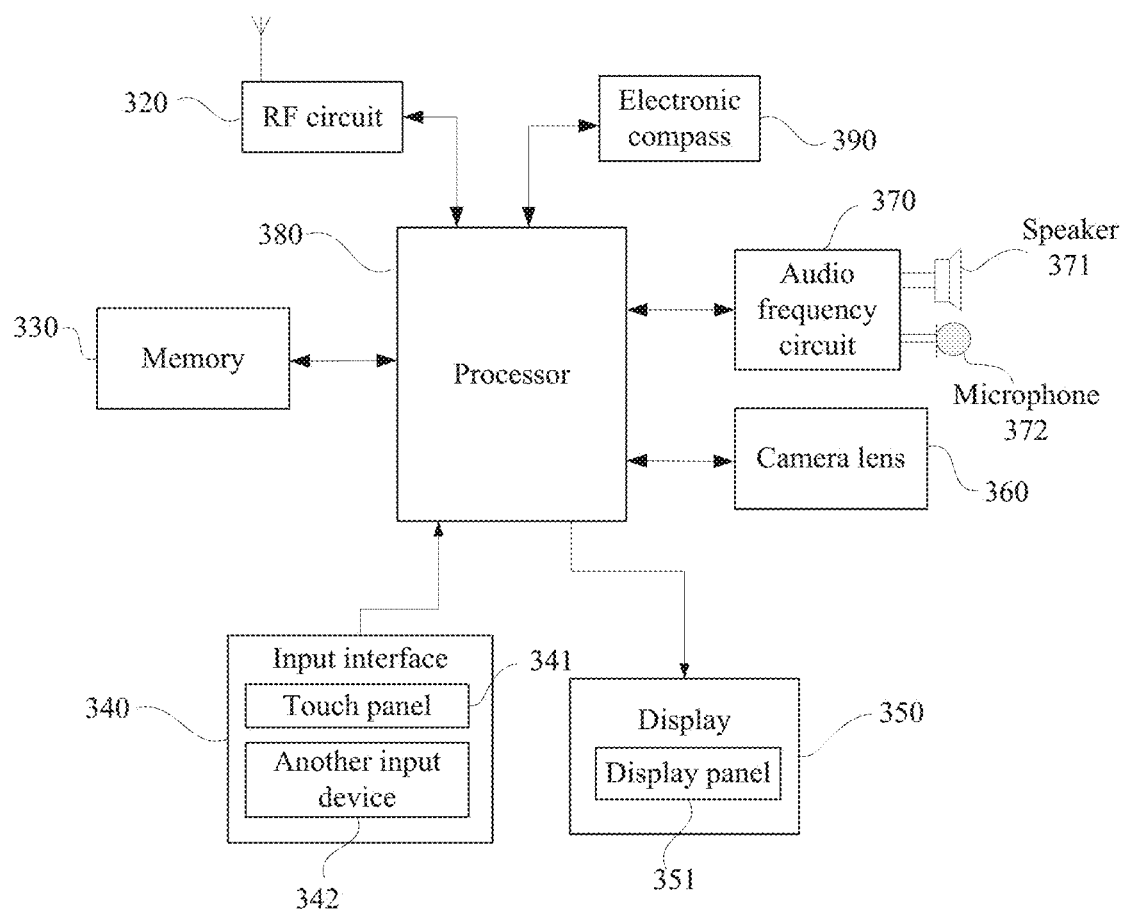
FIG. 3 is a schematic structural diagram 1 of an electronic device according to an embodiment of this application.

For a hardware structure of the electronic device in this embodiment of this application, refer to components of an electronic device shown in FIG. 3.

As shown in FIG. 3, the foregoing electronic device may specifically include components such as a radio frequency (radio frequency, RF radio frequency) circuit 320, a memory 330, an input interface 340, a display 350, a camera lens 360, an audio circuit 370, a processor 380, and an electronic compass 390. A person skilled in the art may understand that the structure of the electronic device shown in FIG. 3 does not constitute any limitation on the electronic device, and may include more or fewer components than those shown in the diagram, or some components may be combined, or a different component layout may be used.

The following describes each component of the electronic device in detail with reference to FIG. 3:

The RF circuit 320 may be configured to receive and send a signal in an information receiving or sending process or a call process. In particular, The RF circuit 320 receives downlink information from a radio access device and then sends the downlink information to the processor 380 for processing, and sends uplink data to the radio access device. Generally, the RF circuit includes but is not limited to an antenna, at least one amplifier, a transceiver, a coupler, a low noise amplifier (low noise amplifier, LNA), a duplexer, and the like. In addition, the RF circuit 320 may further communicate with a network and another device through wireless communication.

The memory 330 may be configured to store a software program and a module, and the processor 380 executes various functional applications and data processing of the electronic device by running the software program and the module that are stored in the memory 330.

The input interface 340 may be configured to receive an entered digit or character information, and generate a key signal input related to a user setting and function control of the electronic device. Specifically, the input interface 340 may include a touch panel 341 and another input device 342.

The display 350 may be configured to display information entered by or provided for a user and various menus of the electronic device. The display 350 may include a display panel 351. Optionally, the display panel 351 may be configured in a form such as a liquid crystal display (liquid crystal display, LCD) or an organic light-emitting diode (organic light-emitting diode, OLED).

The camera lens 360, which may also serve as an input device, is specifically configured to convert a collected analog video or image signal into a digital signal, and store the digital signal in the memory 330. Specifically, the camera lens 360 may include a front-facing camera, a rear-facing camera, a built-in camera, an external camera, and the like. This is not limited in any manner in this embodiment of this application.

The electronic device may further include a gravity sensor (gravity sensor) and another sensor, such as a light sensor, a gyroscope, a barometer, a hygrometer, a thermometer, or an infrared sensor. Details are not described herein.

The audio circuit 370, a speaker 371, and a microphone 372 may provide an audio interface between the user and the electronic device. The audio circuit 370 may transmit an electrical signal to the speaker 371, where the electrical signal is obtained by converting received audio data; and the speaker 371 converts the electrical signal into a sound signal for output. In addition, the microphone 372 converts a collected sound signal into an electrical signal, and the audio circuit 370 receives the electrical signal, converts the electrical signal into audio data, and then outputs the audio data to the RF circuit 320, so that the audio data is sent to, for example, another electronic device, or the audio data is output to the memory 330 for further processing.

The processor 380 is a control center of the electronic device, and connects parts of the entire electronic device by using various interfaces and lines. By running or executing a software program and/or module stored in the memory 330 and invoking data stored in the memory 330, the processor executes various functions of the electronic device and processes data, to perform overall monitoring on the electronic device. Optionally, the processor 380 may include one or more processing units.

The electronic compass 390, which may also be referred to as a digital compass, can determine based on a sensed magnetic field strength of a geomagnetic field, an orientation currently indicated by the electronic compass. The electronic compass may be classified as a two-dimensional electronic compass or a three-dimensional electronic compass depending on whether there is tilt angle compensation, or may be classified as a magneto-resistive effect sensor, a Hall effect sensor, or a fluxgate sensor depending on different types of sensors. This is not limited in any manner in this embodiment of this application.

The electronic device may further include a power supply, a WiFi (wireless fidelity, Wireless Fidelity) module, a Bluetooth module, and the like, although these are not shown. Details are not described herein.

Figure 4:
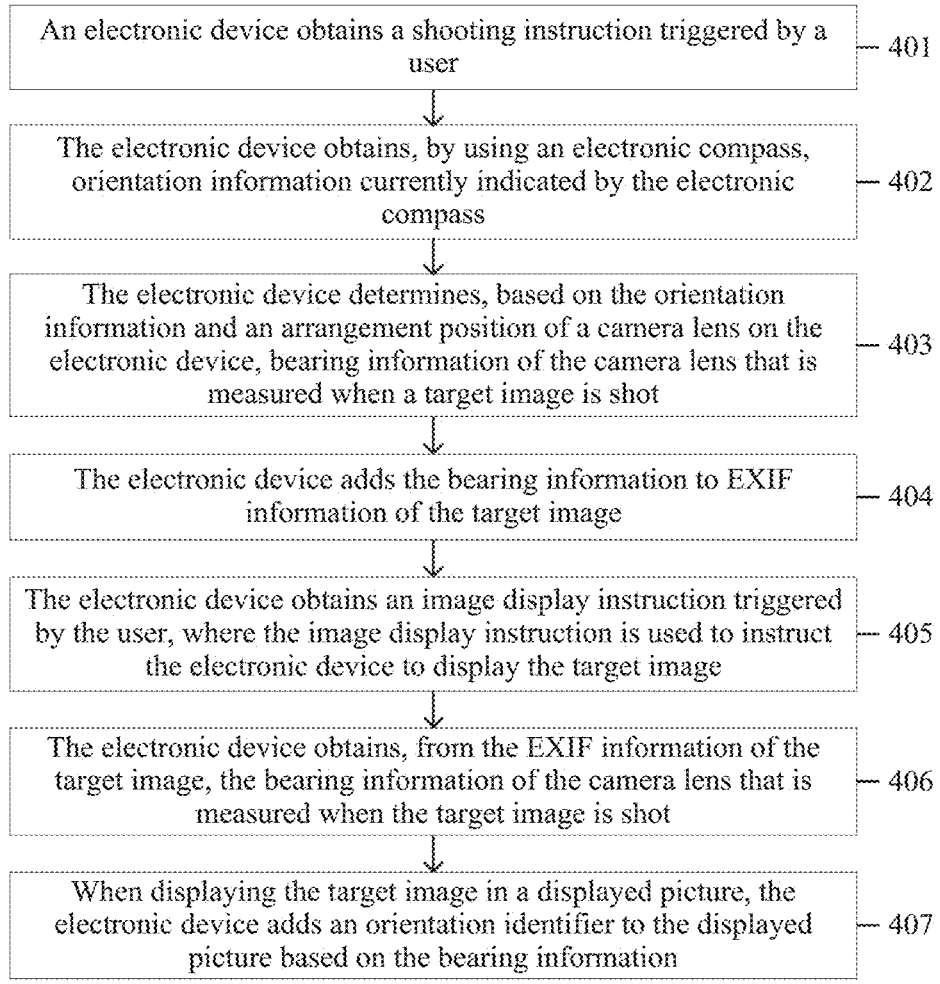
FIG. 4 is a schematic flowchart 1 of an image display method according to an embodiment of this application.

The following describes an image display method according to an embodiment of this application in detail with reference to specific embodiments. As shown in FIG. 4, the method includes the following steps.

401. An electronic device obtains a shooting instruction triggered by a user.

For example, when the user enables a video or photo shooting function of the electronic device, the electronic device enters a shooting interface, and if the user triggers a shutter button in the shooting interface, the electronic device generates a shooting instruction in response to a button operation currently triggered by the user, where the shooting instruction is used to instruct the electronic device to store a picture currently captured by a camera lens.

After the electronic device obtains the shooting instruction, the electronic device may project reflected light of an object to a light sensor (for example, a CCD (charge-coupled device, charge-coupled device)) in the electronic device by using the camera lens, the light sensor converts an optical signal of the reflected light into an electrical signal, and data obtained after particular conversion and processing are performed on the electrical signal is stored in the electronic device in a particular form.

In addition, in this embodiment of this application, after the electronic device obtains the shooting instruction, the electronic device may further perform the following steps 402 to 404.

402. The electronic device obtains, by using an electronic compass, orientation information currently indicated by the electronic compass.

403. The electronic device determines, based on the orientation information and an arrangement position of a camera lens on the electronic device, bearing information of the camera lens that is measured when a target image is shot.

In step 402, the electronic compass, namely, a digital compass, is usually disposed in the electronic device. The electronic compass can determine, based on a sensed magnetic field strength of a geomagnetic field, the orientation information currently indicated by the electronic compass, namely, current orientation information of the electronic device. For example, as shown in FIG. 5, the electronic compass shows that currently, direction in front of the electronic device is west, direction on the right of the electronic device is north, direction in the back of the electronic device is east, and direction on the left of the electronic device is south.

Because the arrangement position of the camera lens on the electronic device is fixed, in step 403, the electronic device may determine current bearing information of the camera lens based on the orientation information and the specific arrangement position of the camera lens on the electronic device.

Figure 5:
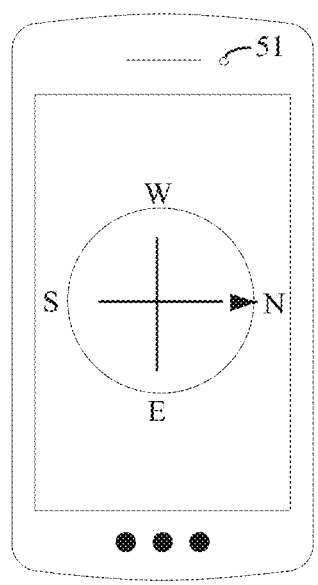
FIG. 5 is a schematic diagram 1 of an application scenario of an image display method according to an embodiment of this application.

For example, as shown in FIG. 5, if the electronic device enables a front-facing camera 51 for shooting, with reference to a current orientation of the electronic device shown in FIG. 5, it can be determined that when the front-facing camera 51 is used to shoot an image (namely, the target image), a bearing of the front-facing camera 21 is the east direction. In this case, the bearing information generated by the electronic device may be used to indicate the east direction.

404. The electronic device adds the bearing information to EXIF information of the target image.

In step 404, the electronic device may store the target image in an EXIF format. In addition, as shown in FIG. 2, the electronic device adds the bearing information to the EXIF information of the target image.

Specifically, the EXIF information includes different fields, and a corresponding tag is set for each field. Fields corresponding to a tag 0x927C and a tag 0x9286 are customized by a manufacturer and a user, respectively. Therefore, the electronic device may add the bearing information to the field or fields corresponding to the tag 0x927C and/or the tag 0x9286 in the EXIF information.

Subsequently, when the user views or browses the target image on the electronic device, the electronic device may continue to perform the following steps 405 to 407.

405. The electronic device obtains an image display instruction triggered by the user, where the image display instruction is used to instruct the electronic device to display the target image.

Figure 6:
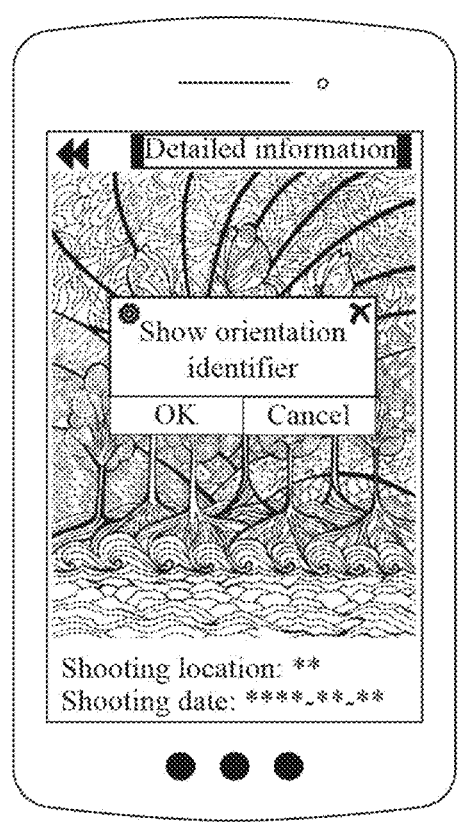
FIG. 6 is a schematic diagram 2 of an application scenario of an image display method according to an embodiment of this application.

For example, when the user opens the target image, the electronic device is triggered to generate the image display instruction. In this case, as shown in FIG. 6, the electronic device may use a display window to prompt the user whether to display an orientation identifier. If the user determines to display the orientation identifier, the electronic device continues to perform the following steps 406 to 407.

Certainly, the electronic device may alternatively display an orientation identifier in each displayed image by default, and the user may modify the default setting in an option such as settings. This is not limited in any manner in this embodiment of this application.

406. The electronic device obtains, from the EXIF information of the target image, the bearing information of the camera lens that is measured when the target image is shot.

After obtaining the image display instruction, the electronic device may obtain, from the stored EXIF information of the target image, for example, the field corresponding to the tag 0x9286 in the EXIF information, the bearing information of the camera lens that is measured when the target image is shot.

In addition, the electronic device may further display an image in the target image in a displayed picture.

407. When displaying the target image in a displayed picture, the electronic device adds an orientation identifier to the displayed picture based on the bearing information.

Specifically, the electronic device may generate the orientation identifier based on the bearing information obtained in step 406.

Figure 8:
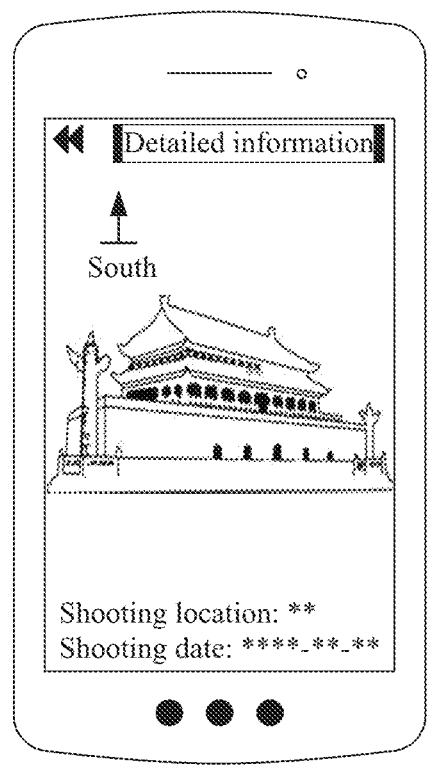
FIG. 8 is a schematic diagram 4 of an application scenario of an image display method according to an embodiment of this application.

For example, the orientation identifier may be a first identifier, and the first identifier is used to indicate a bearing of the camera lens that is measured when the target image is shot. For example, if the bearing information records that a bearing of the camera lens that is measured when the target image is shot is the south direction, the electronic device may convert an orientation indicated by the bearing information into a south direction identifier shown in FIG. 8. For another example, if the bearing information records four orientations of east, south, west, and north of the camera lens that are measured when the target image is shot, the electronic device may convert the orientations indicated by the bearing information into the orientation identifier of the four orientations of east, south, west, and north shown in FIG. 7.

In addition, the electronic device may display the orientation identifier (shown in FIG. 8) within the target image, or may display the orientation identifier (shown in FIG. 7) at a location outside the target image in the displayed picture. This is not limited in any manner in this embodiment of this application.

Alternatively, the orientation identifier may be a second identifier, and the second identifier is used to indicate an orientation of a shot object in the target image. Specifically, when the electronic device shoots the target image, a relationship between positions of the camera lens and the shot object is fixed, and therefore, the electronic device may determine, by using an image recognition technology, the orientation of the shot object in the target image based on the bearing information.

Figure 9:
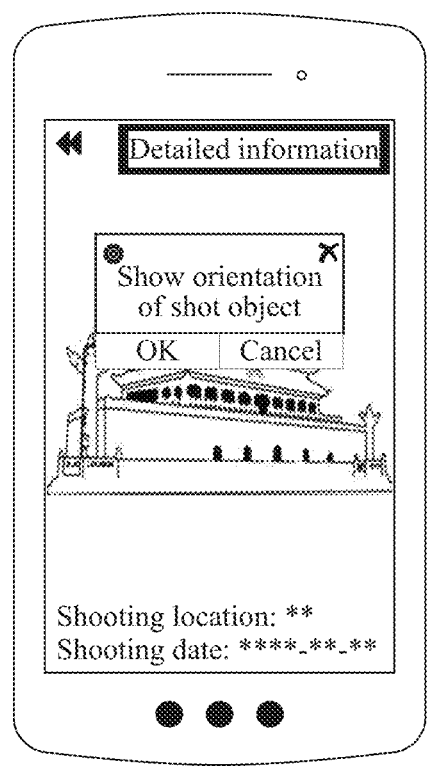
FIG. 9 is a schematic diagram 5 of an application scenario of an image display method according to an embodiment of this application.
Figure 10:
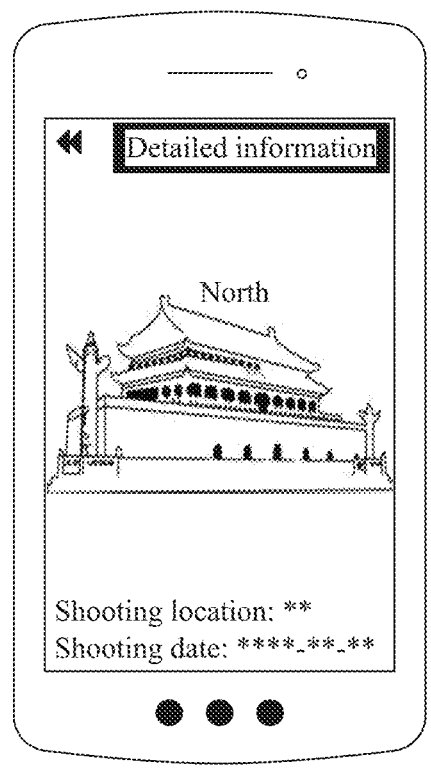
FIG. 10 is a schematic diagram 6 of an application scenario of an image display method according to an embodiment of this application.

In this case, as shown in FIG. 9, the electronic device may use a display window to prompt the user whether to display the orientation of the shot object. If the user determines to display the orientation of the shot object, the electronic device may recognize a main line in the target image, for example, a line 1 of Tian'anmen in FIG. 10, by using an image recognition method such as edge detection. The electronic device may estimate an original orientation of the line 1 based on an included angle between the line 1 and a horizontal line and bearing information of the camera lens recorded during shooting (for example, the bearing information is used to indicate that a bearing of the camera lens is 60° east of north during shooting). Further, the electronic device determines, based on the original orientation of the line 1, that an orientation of Tian'anmen in FIG. 10 is due north. In this case, the electronic device may generate a second identifier corresponding to the orientation of Tian'anmen (the shot object), namely, an identifier "North" in FIG. 9, and add the second identifier to the target image.

Figure 11:
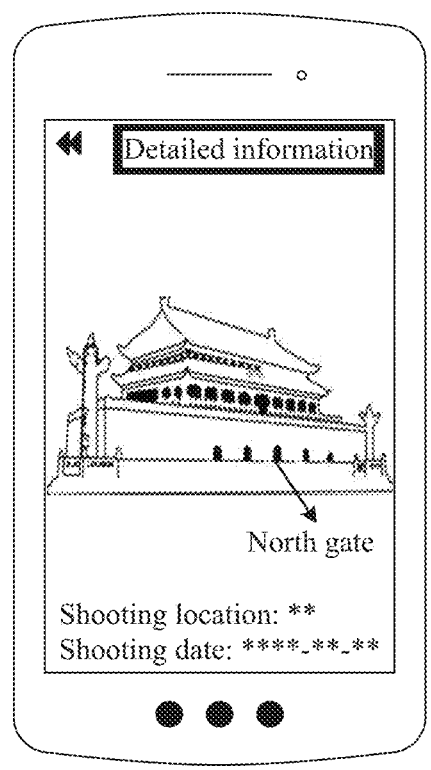
FIG. 11 is a schematic diagram 7 of an application scenario of an image display method according to an embodiment of this application.

Further, as shown in FIG. 11, the electronic device may further recognize a gate of Tian'anmen in the target image by using a method such as image recognition, then determine, based on the orientation of Tian'anmen (the shot object), that the gate is a north gate of Tian'anmen, and further display an orientation identifier "North gate" in the target image.

In this way, the electronic device can help the user determine a specific orientation of the shot object based on a shooting orientation of the target image, and notify the user of the specific orientation in the displayed picture by using the orientation identifier, so that the user can accurately learn of a shooting scenario of the target image.

Figure 12:
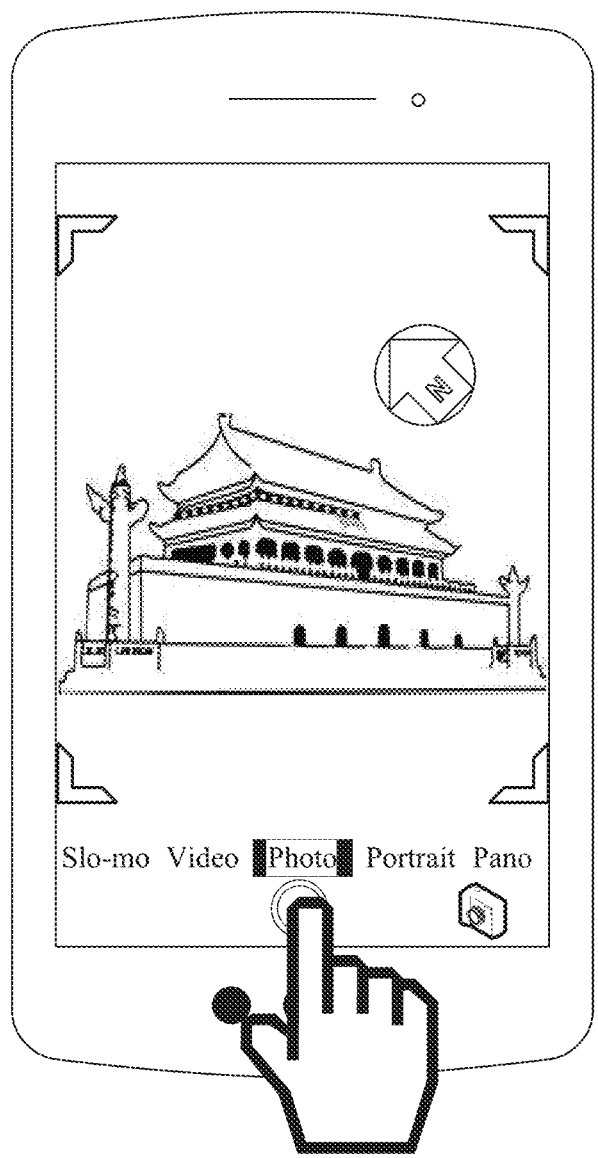
FIG. 12 is a schematic diagram 8 of an application scenario of an image display method according to an embodiment of this application.

Further, when shooting the target image, the electronic device may alternatively periodically or aperiodically obtain the bearing information by using the electronic compass and generate the orientation identifier. In this way, as shown in FIG. 12, the electronic device may display the orientation identifier in the shot picture, and the orientation identifier may always indicate the north direction, to notify the user of a current shooting orientation during shooting.

It may be understood that the electronic device may display the target image and the orientation identifier at the same time, or may first display the target image in the displayed picture, and then display the orientation identifier in the displayed picture. A displaying time of the orientation identifier may alternatively be set by the user. This is not limited in any manner in this embodiment of this application.

Further, the image display method provided in this embodiment of this application may further include the following steps 408 to 409.

408. The electronic device obtains an image classification instruction triggered by the user, where the image classification instruction is used to instruct the electronic device to classify N stored images, and N is an integer greater than 0.

409. The electronic device classifies the N images into M image sets based on bearing information of each image, where all images in each image set have same bearing information, and M is an integer greater than 0.

Figure 13:
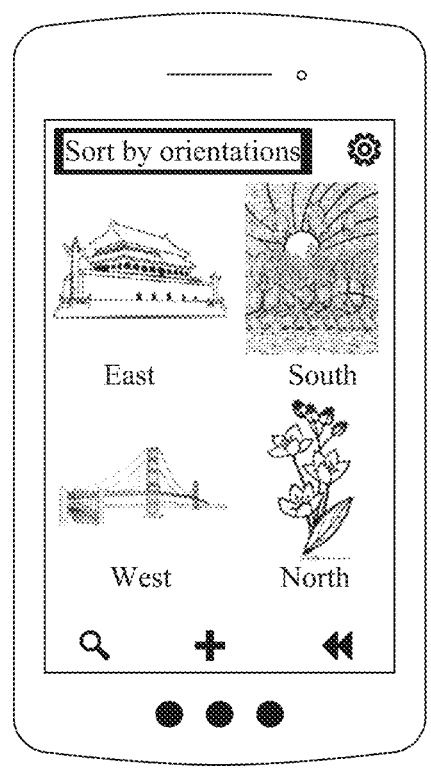
FIG. 13 is a schematic diagram 9 of an application scenario of an image display method according to an embodiment of this application.

In step 408, as shown in FIG. 13, when the user triggers a shooting orientation-based image classification function, the electronic device may generate the image classification instruction, and the image classification instruction is used to instruct the electronic device to classify the N (N>0) stored images.

The N images may be all images stored in the electronic device, or may be one or more images selected by the user from all the images. This is not limited in any manner in this embodiment of this application.

The electronic device has recorded, in EXIF information of each image, bearing information measured when the image is shot. Therefore, in step 409, the electronic device may classify the N images into the M (M>0) image sets based on the bearing information of each image, and images in each image set have a same shooting orientation.

For example, as shown in FIG. 13, the electronic device classifies, based on the bearing information of each image, the N images into four image sets, namely, an east image set, a south image set, a west image set, and a north image set. All pictures whose bearing information indicates the east direction are within the image set marked as "East"; all pictures whose bearing information indicates the south direction are within the image set marked as "South"; all pictures whose bearing information indicates the west direction are within the image set marked as "West"; and all pictures whose bearing information indicates the north direction are within the image set marked as "North".

Certainly, it may be understood that the electronic device may further set, based on the bearing information of each image, sets of images whose orientations are "southeast", "northwest", and the like. This is not limited in any manner in this embodiment of this application.

Figure 14:
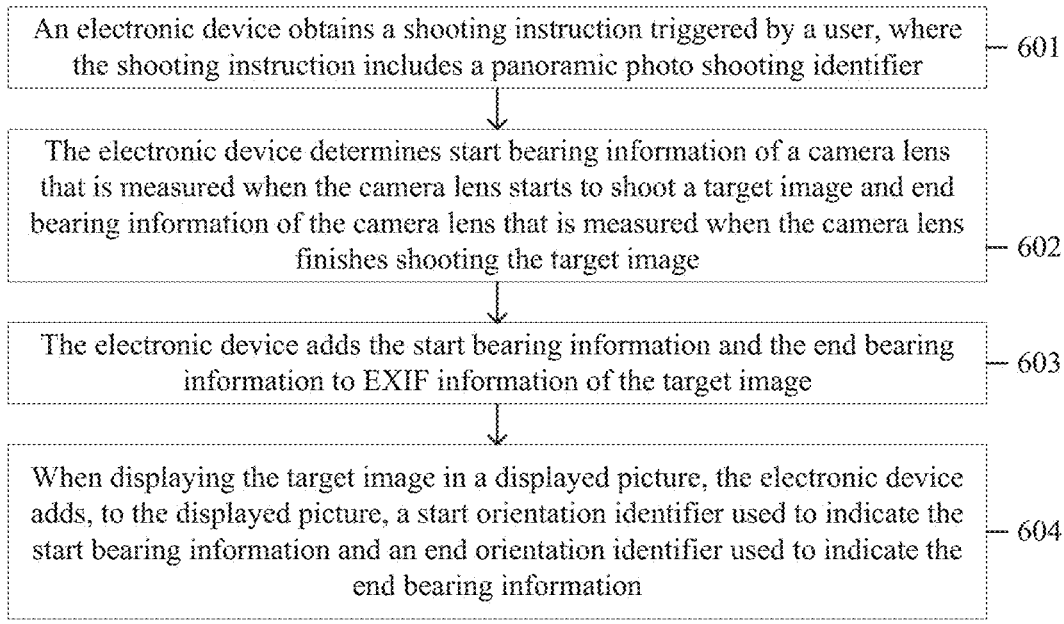
FIG. 14 is a schematic flowchart 2 of an image display method according to an embodiment of this application.

Further, an embodiment of this application further provides an image display method. As shown in FIG. 14, the method includes the following steps.

601. An electronic device obtains a shooting instruction triggered by a user, where the shooting instruction includes a panoramic photo shooting identifier.

Similar to step 401, if the user triggers a shutter button for panoramic photo shooting in a shooting interface, the electronic device generates a shooting instruction in response to a button operation currently triggered by the user. A difference is that the shooting instruction may include the panoramic photo shooting identifier, so that the electronic device learns that a current shooting mode is a panoramic photo shooting mode.

602. The electronic device determines start bearing information of a camera lens that is measured when the camera lens starts to shoot a target image and end bearing information of the camera lens that is measured when the camera lens finishes shooting the target image.

When shooting a panoramic image, the user usually needs to trigger a shutter button once when starting to shoot the image, and triggers the shutter button again when finishing the shooting. When the user triggers the shutter button for the first time (in other words, the user starts to shoot a panoramic picture similar to steps 402 and 403, the electronic device may determine, by using an electronic compass, start bearing information measured when the electronic device starts to shoot the target image; and when the user triggers the shutter button for the second time (in other words, the user finishes shooting the panoramic picture), similar to steps 402 and 403, the electronic device may determine, by using the electronic compass, start bearing information measured when the electronic device finishes shooting the target image.

For example, as shown in FIG. 15, when the user triggers the shutter button for the first time, the electronic device determines that the start bearing information measured when the electronic device starts to shoot the target image is the north direction. When the user triggers the shutter button for the second time, the electronic device determines that the end bearing information measured when the electronic device finishes shooting the target image is the east direction. In other words, the user shoots the target image by rotating the electronic device by 90° from north to east.

603. The electronic device adds the start bearing information and the end bearing information to EXIF information of the target image.

Unlike step 404, the start bearing information corresponds to a shot picture (usually, the first frame of image) obtained when shooting of the target image starts, and the end bearing information corresponds to a shot picture (usually, the last frame of image) obtained when the shooting of the target image ends.

604. When displaying the target image in a displayed picture, the electronic device adds, to the displayed picture, a start orientation identifier used to indicate the start bearing information and an end orientation identifier used to indicate the end bearing information.

When the electronic device obtains an image display instruction used to instruct the electronic device to display the target image, the electronic device may obtain, from the EXIF information of the target image, the start bearing information and the end bearing information that are recorded when the target image is shot. Further, the electronic device may generate a corresponding start orientation identifier based on the start bearing information, and generate a corresponding end orientation identifier based on the end bearing information.

Figure 16:
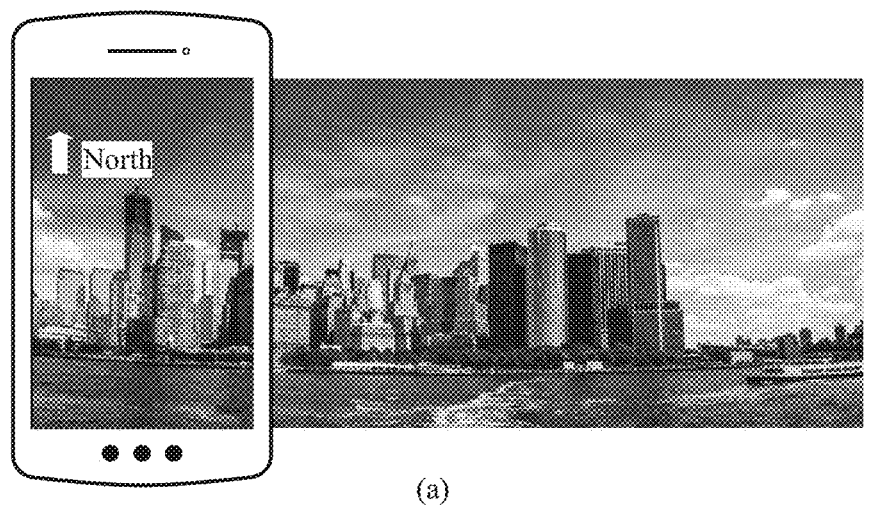
FIG. 16 is a schematic diagram 11 of an application scenario of an image display method according to an embodiment of this application.
Figure 16:
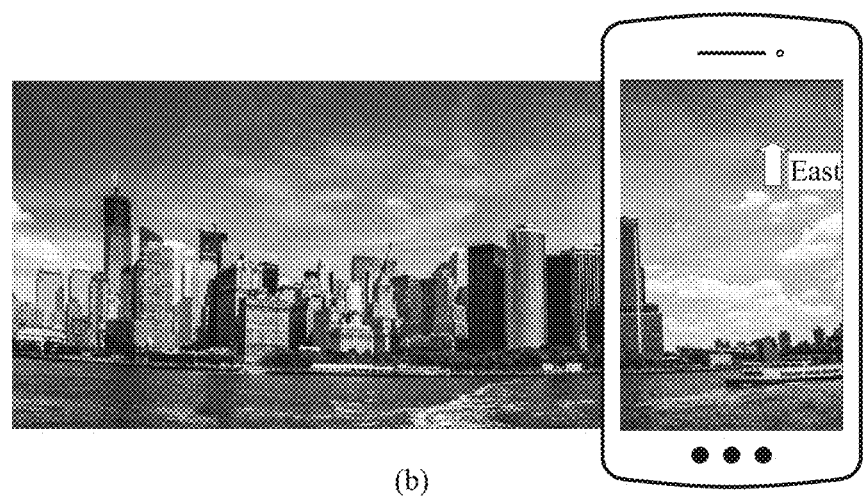

For example, the target image is played in full screen. As shown in FIG. 16, when displaying the first frame of image in the target image, the electronic device may add the start orientation identifier, namely, a north direction identifier in a part (a) of FIG. 16, to the first frame of image; and when displaying the last frame of image in the target image, the electronic device may add the end orientation identifier, namely, an east direction identifier in a part (b) of FIG. 16, to the last frame of image.

Further, the electronic device may further compute an orientation of another location in the target image based on the start bearing information and the end bearing information that have been recorded. For example, as shown in FIG.

Figure 17:
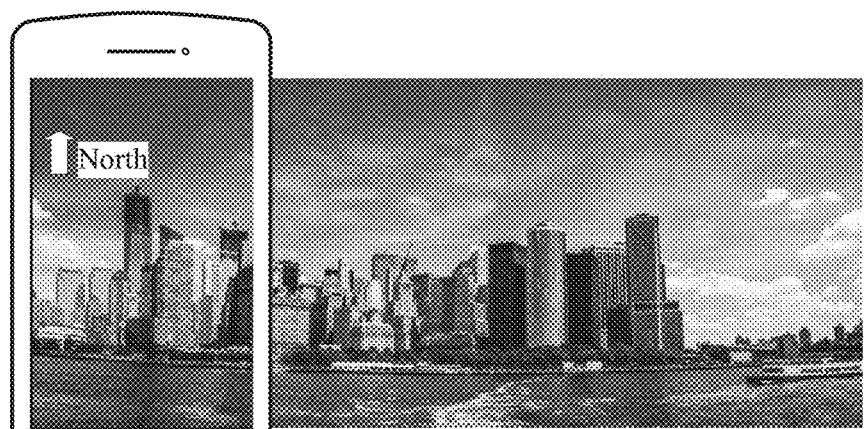
FIG. 17 is a schematic diagram 12 of an application scenario of an image display method according to an embodiment of this application.
Figure 17:
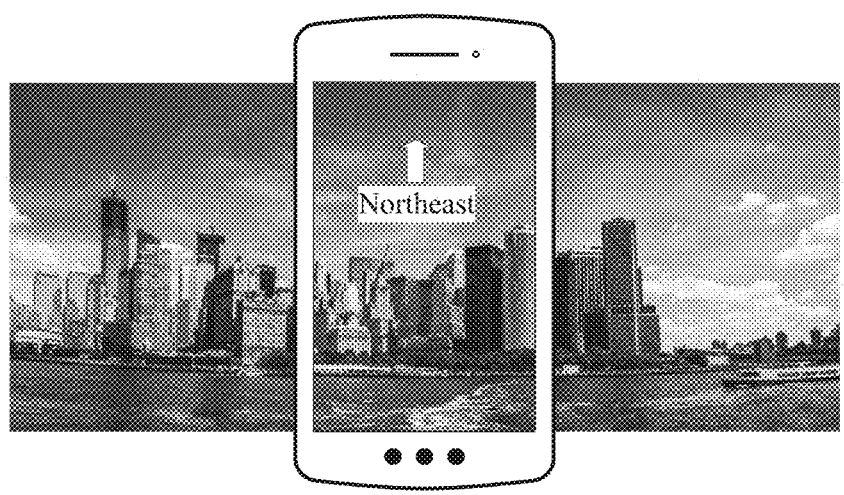
Figure 17:
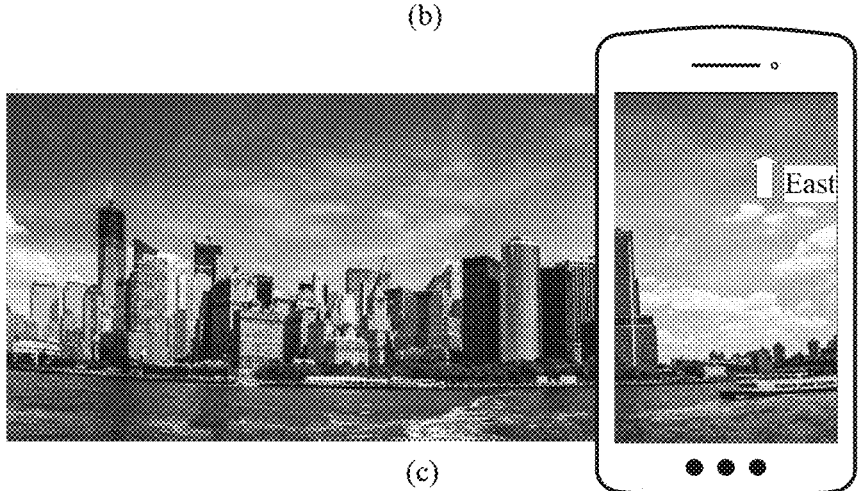

17, the electronic device computes, based on a play speed of the target image, the start bearing information (the north direction), and the end bearing information (the east direction), a picture that corresponds to the orientation of northeast in the target image. Therefore, when the target image is played in full screen, and the picture corresponding to the orientation of northeast is played, as shown in a part (b) of FIG. 17, the electronic device may add an identifier of the orientation of northeast to the picture. In this way, when a panoramic target image is played in full screen, a direction identifier corresponding to a bearing measured when the displayed picture is shot can be added to the corresponding displayed picture.

Figure 18:
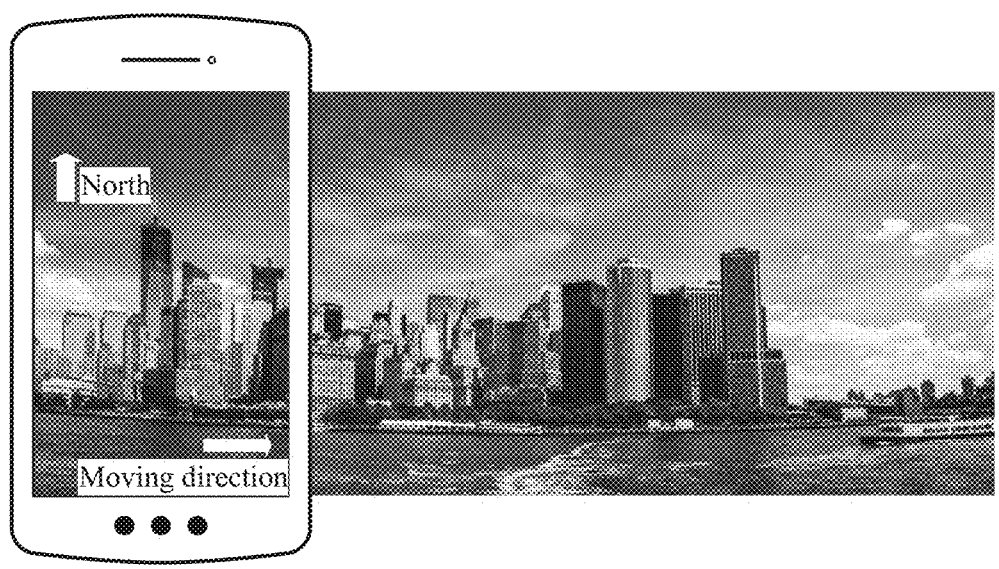
FIG. 18 is a schematic diagram 13 of an application scenario of an image display method according to an embodiment of this application.

In addition, when the electronic device plays the target image in full screen, as shown in FIG. 18, the electronic device may further display a moving direction identifier, to prompt the user to move the electronic device in the moving direction. When the electronic device is being moved, the electronic device may display the target image frame by frame and a corresponding orientation identifier (for example, a north direction identifier in FIG. 18), so that the user can fully learn of a panoramic photo shooting scenario of the target image.

Further, when the electronic device plays the target image in full screen based on the moving direction, the electronic device may further obtain current bearing information in real time by using the electronic compass. If the current bearing information is the same as recorded bearing information, the electronic device may display a picture that corresponds to the bearing information during shooting. For example, a direction in which the electronic device shoots the target image, as shown in FIG. 15, indicates a rotation of 90° from north to east. When the electronic device displays the target image, if a current shooting orientation of the electronic device is also the north direction, the electronic device may display a picture that corresponds to the north direction in the target image. If the electronic device is also rotated by 90° from north to east when displaying the target image, the entire target image can be viewed.

Figure 19:
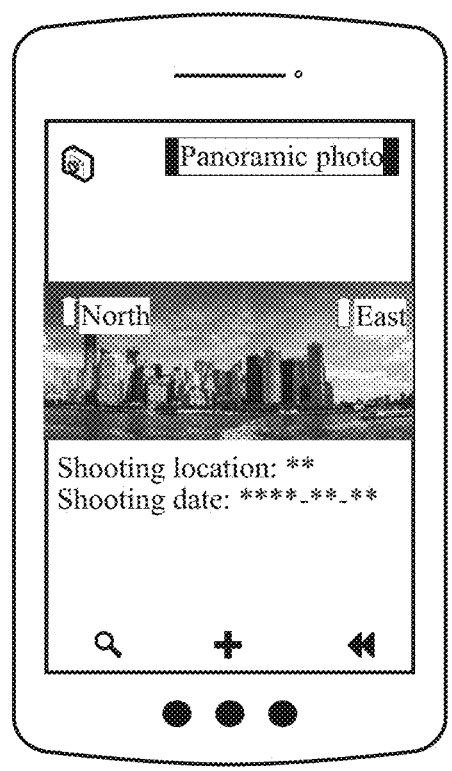
FIG. 19 is a schematic diagram 14 of an application scenario of an image display method according to an embodiment of this application.

Certainly, the electronic device may alternatively display the target image as a thumbnail. As shown in FIG. 19, in this case, the electronic device may still add a corresponding start orientation identifier and end orientation identifier to the target image. This is not limited in any manner in this embodiment of this application.

It may be understood that, to implement the foregoing functions, the electronic device and the like include a corresponding hardware structure and/or software module for performing each function. A person skilled in the art may be easily aware that, in combination with the example units and algorithm steps described in the embodiments disclosed in this specification, the embodiments of this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the embodiments of this application.

Function modules may be obtained by dividing the foregoing electronic device and the like based on the foregoing method examples in the embodiments of this application. For example, the function modules may be obtained through division for corresponding functions, or two or more functions may be integrated into one processing module. The integrated module may be implemented in a form of hardware, or may be implemented in a form of a software function module. It should be noted that division of modules in the embodiments of this application is an example, and is merely logical function division, and there may be another division manner during practical implementation.

Figure 20:
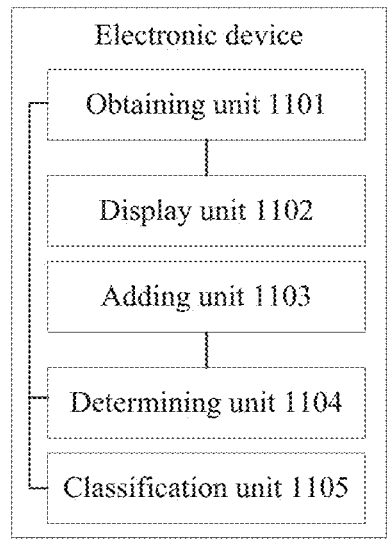
FIG. 20 is a schematic structural diagram 2 of an electronic device according to an embodiment of this application.

When the function modules are obtained through division for the functions, FIG. 20 is a possible schematic structural diagram of an electronic device in the foregoing embodiments. The electronic device includes an obtaining unit 1101, a display unit 1102, an adding unit 1103, a determining unit 1104, and a classification unit 1105.

The obtaining unit 1101 is configured to support the electronic device in performing the processes 401 and 402, and processes 405 and 406, and 408 in FIG. 4, the process 601 in FIG. 14, the processes 101 and 102 in FIG. 23, and the processes 201 and 202 in FIG. 25; the display unit 1102 is configured to support the electronic device in performing the process 407 in FIG. 4, the process 604 in FIG. 14, and the processes 203, and 205 and 206 in FIG. 25; the adding unit 1103 is configured to support the electronic device in performing the process 404 in FIG. 4, the process 603 in FIG. 14, and the process 103 in FIG. 23; the determining unit 1104 is configured to support the electronic device in performing the process 403 in FIG. 4, the process 602 in FIG. 14, and the process 204 in FIG. 25; and the classification unit 1105 is configured to support the electronic device in performing the process 409 in FIG. 4. All related content of the steps in the foregoing method embodiments can be used for function descriptions of the corresponding function modules. Details are not described herein again.

Figure 21:
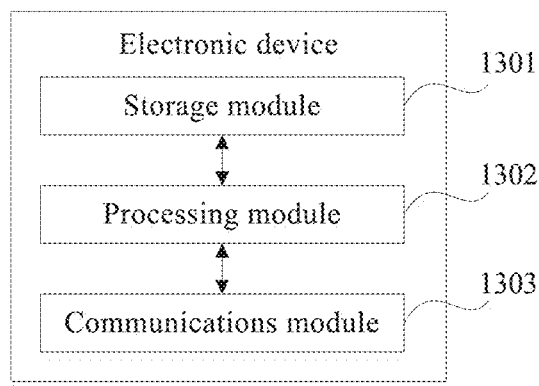
FIG. 21 is a schematic structural diagram 3 of an electronic device according to an embodiment of this application.

When an integrated unit is used, FIG. 21 is a possible schematic structural diagram of an electronic device in the foregoing embodiments. The electronic device includes a processing module 1302 and a communications module 1303. The processing module 1302 is configured to control and manage actions of the electronic device. The communications module 1303 is configured to support communication between UE and another network entity. The electronic device may further include a storage module 1301, configured to store program code and data of the electronic device.

The processing module 1302 may be a processor or a controller, such as a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor/controller may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 1303 may be a transceiver, a transceiver circuit, an input interface, or the like. The storage module 1301 may be a memory.

When the processing module 1302 is a processor, the communications module 1303 is an RF transceiver circuit, and the storage module 1301 is a memory, the electronic device provided in this embodiment of this application may be the electronic device shown in FIG. 3.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but the protection scope of this application is not limited thereto. Any variation or replacement within the technical scope disclosed in the present invention shall fall within the protection scope of this application. Therefore, the protection scope of this application shall be subject to the protection scope of the claims.

What is claimed is:

1. An image display method implemented by an electronic device, the image display method comprising:
    subsequent to shooting a panoramic image, obtaining a first instruction from a user, wherein the first instruction instructs the electronic device to display the panoramic image;
    obtaining, in response to the first instruction, historical bearing information and real-time bearing information of a camera lens of the electronic device, wherein the historical bearing information indicates a historical bearing of the camera lens when the panoramic image was shot and is based on orientation information indicated by an electronic compass, and wherein the real-time bearing information indicates a current target bearing of the camera lens obtained by the electronic compass currently;
    subsequent to obtaining the historical bearing information and the real-time bearing information, displaying a first target picture corresponding to the current target bearing in the panoramic image when the historical bearing information comprises the current target bearing,
    wherein after obtaining the historical bearing information and the real-time bearing information, the image display method further comprises:
        determining a second target picture corresponding to the current target bearing based on the historical bearing information and the panoramic image when the historical bearing information does not comprise the current target bearing; and
        displaying the second target picture,
    wherein the historical bearing information further comprises an included angle formed when the camera lens is rotated from a first historical bearing to a second historical bearing, and
    wherein determining the second target picture comprises:
        computing, based on the historical bearing information, a corresponding sub-picture in the panoramic image each time the camera lens is rotated by a unit angle;
        setting a sub-picture corresponding to the current target bearing as a target sub-picture; and
        setting a picture comprising the target sub-picture as the second target picture.

2. The image display method of claim 1, wherein after displaying the first target picture, the image display method further comprises adding an orientation identifier indicating the current target bearing to the first target picture.

3. The image display method of claim 1, wherein before obtaining the first instruction, the image display method further comprises:
    obtaining a second instruction from the user, wherein the second instruction instructs the electronic device to shoot the panoramic image;
    obtaining, in response to the second instruction, the historical bearing information of the camera lens in a shooting process of the panoramic image; and
    adding the historical bearing information to exchangeable image file (EXIF) information of the panoramic image.

4. The image display method of claim 1, further comprising:
    obtaining current real-time bearing information of the camera lens and historical bearing information of each of N images, wherein N is an integer greater than zero; and
    displaying K images whose historical bearing information is the same as the current real-time bearing information in the N images, wherein K is an integer greater than or equal to zero.

5. An electronic device, comprising:
    a camera lens;
    a display;
    an input interface configured to obtain, subsequent to shooting a panoramic image, a first instruction from a user, wherein the first instruction instructs the electronic device to display the panoramic image; and
    a processor coupled to the camera lens, the display, and the input interface, and configured to:
        obtain historical bearing information and real-time bearing information of the camera lens, wherein the historical bearing information indicates a historical bearing of the camera lens when the panoramic image was shot and is based on orientation information indicated by an electronic compass, and wherein the real-time bearing information indicates a current target bearing of the camera lens obtained by the electronic compass currently;
        subsequent to obtaining the historical bearing information and the real-time bearing information, control the display to display a first target picture corresponding to the current target bearing in the panoramic image when the historical bearing information comprises the current target bearing;
        determine a second target picture corresponding to the current target bearing based on the historical bearing information and the panoramic image when the historical bearing information does not comprise the current target bearing; and
        control the display to display the second target picture, wherein the historical bearing information further comprises an included angle formed when the camera lens is rotated from a first historical bearing to a second historical bearing, and wherein the processor is further configured to:
compute, based on the historical bearing information, a corresponding sub-picture in the panoramic image each time the camera lens is rotated by a unit angle;
set a sub-picture corresponding to the current target bearing as a target sub-picture; and
set a picture comprising the target sub-picture as the second target picture.

6. The electronic device of claim 5, wherein the processor is further configured to control the display to display, in the first target picture, an orientation identifier indicating the current target bearing.

7. The electronic device of claim 5, wherein the input interface is further configured to obtain a second instruction from the user, wherein the second instruction instructs the electronic device to shoot the panoramic image, and wherein the processor is further configured to:
obtain the historical bearing information of the camera lens in a shooting process of the panoramic image; and
add the historical bearing information to exchangeable image file (EXIF) information of the panoramic image.

8. The electronic device of claim 5, wherein the processor is further configured to:
obtain current real-time bearing information of the camera lens and historical bearing information of each of N images, wherein N is an integer greater than zero; and
control the display to display K images whose historical bearing information is the same as the current real-time bearing information in the N images, wherein K is an integer greater than or equal to zero.

9. An electronic device, comprising:
a display;
a camera lens;
an input interface configured to obtain a first instruction from a user, wherein the first instruction instructs the electronic device to display a target image;
an electronic compass configured to provide orientation information currently indicated by the electronic compass; and
a processor coupled to the display, the camera lens, the input interface, and the electronic compass, and configured to:
obtain, in response to the first instruction, bearing information of the camera lens based on the orientation information from the electronic compass, wherein the bearing information indicates a bearing of the camera lens when the target image is shot; and
add an orientation identifier to a displayed picture based on the bearing information when the target image is displayed in the display, wherein the orientation identifier comprises a first identifier or a second identifier, wherein the first identifier indicates the bearing of the camera lens and identifies North, South, East, West, or a combination thereof, wherein the second identifier indicates an orientation of a shot object in the target image, and wherein the orientation corresponds to North, South, East, West, or a combination thereof,
wherein the input interface is further configured to obtain a second instruction from the user,
wherein the second instruction instructs the electronic device to shoot the target image using the camera lens,
wherein the processor is further configured to:
determine, in response to the second instruction, the bearing information; and
add the bearing information to exchangeable image file (EXIF) information of the target image,
wherein the second instruction comprises a panoramic photo shooting identifier, and
wherein the processor is further configured to determine the bearing information by being configured to:
determine start bearing information of the camera lens when the camera lens starts to shoot the target image and end bearing information of the camera lens when the camera lens finishes shooting the target image;
add a third identifier to the displayed picture, wherein the third identifier indicates the start bearing information; and
add a fourth identifier to the displayed picture, wherein the fourth identifier indicates the end bearing information.

10. The electronic device of claim 9, wherein the processor is further configured to determine the bearing information by being configured to:
obtain the orientation information currently indicated by the electronic compass; and
determine, based on the orientation information and an arrangement position of the camera lens on the electronic device, the bearing information.

11. The electronic device of claim 9, wherein the orientation identifier is the first identifier, and wherein the processor is further configured to add the orientation identifier to the displayed picture by being configured to:
generate the first identifier corresponding to the bearing information; and
add the first identifier to the displayed picture.

12. The electronic device of claim 9, wherein the orientation identifier is the second identifier, and wherein the processor is further configured to add the orientation identifier to the displayed picture by being configured to:
determine the orientation of the shot object in the target image based on the bearing information;
generate the second identifier corresponding to the orientation of the shot object; and
add the second identifier to the displayed picture.

13. The electronic device of claim 9, wherein the processor is further configured to add the third identifier to the displayed picture by being configured to:
add the third identifier to a first frame of image in the target image when displaying the first frame of image; and
add the fourth identifier to a last frame of image in the target image when displaying the last frame of image.

14. The electronic device of claim 10, wherein the processor is further configured to:
obtain a third instruction from the user, wherein the third instruction instructs the electronic device to classify N stored images, and wherein N is an integer greater than zero; and
classify, in response to the third instruction, the N stored images into M image sets based on bearing information of each image, wherein all images in each image set of the M image sets have a same bearing information, and wherein M is an integer greater than zero.

* * * * *